United States Patent
Tanabe

(10) Patent No.: US 9,525,209 B2
(45) Date of Patent: Dec. 20, 2016

(54) METHOD, APPARATUS, AND COMPUTER-READABLE STORAGE MEDIUM FOR CONTACTLESS POWER SUPPLY AND POWER CONTROL

(75) Inventor: Akihiro Tanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 161 days.

(21) Appl. No.: 13/218,326

(22) Filed: Aug. 25, 2011

(65) Prior Publication Data

US 2012/0049791 A1 Mar. 1, 2012

(30) Foreign Application Priority Data

Aug. 31, 2010 (JP) ................. 2010-194048

(51) Int. Cl.
| | |
|---|---|
| H02J 7/00 | (2006.01) |
| H01F 27/42 | (2006.01) |
| H01F 37/00 | (2006.01) |
| H01F 38/00 | (2006.01) |
| H01Q 7/00 | (2006.01) |
| H02J 5/00 | (2016.01) |
| H02J 7/02 | (2016.01) |

(52) U.S. Cl.
CPC ............... *H01Q 7/00* (2013.01); *H02J 5/005* (2013.01); *H02J 7/025* (2013.01)

(58) Field of Classification Search
CPC ............ H02J 5/005; H02J 7/025; H01F 38/14; H04B 10/07953
USPC ........................................... 320/108
See application file for complete search history.

(56) References Cited

U.S. PATENT DOCUMENTS

| | | | |
|---|---|---|---|
| 5,760,688 A | 6/1998 | Kasai | |
| 8,452,233 B2* | 5/2013 | Noel | 455/41.1 |
| 8,487,479 B2* | 7/2013 | Cook | H01Q 7/08 307/104 |
| 2005/0068019 A1* | 3/2005 | Nakamura et al. | 323/355 |
| 2007/0229022 A1* | 10/2007 | Hanafusa et al. | 320/101 |
| 2008/0009683 A1 | 1/2008 | Bogoni | |
| 2008/0075322 A1 | 3/2008 | Dube | |
| 2009/0212736 A1* | 8/2009 | Baarman et al. | 320/106 |
| 2009/0243397 A1* | 10/2009 | Cook | H02J 5/005 307/104 |
| 2010/0164437 A1* | 7/2010 | McKinley et al. | 320/145 |
| 2010/0320962 A1* | 12/2010 | Sekita | H02J 7/025 320/108 |
| 2012/0062173 A1* | 3/2012 | Choi et al. | 320/108 |
| 2013/0043837 A1* | 2/2013 | Sekita et al. | 320/108 |
| 2013/0154560 A1* | 6/2013 | Walley et al. | 320/108 |

FOREIGN PATENT DOCUMENTS

| | | |
|---|---|---|
| CN | 1750389 A | 3/2006 |
| JP | H07-131376 A | 5/1995 |
| JP | 09-298486 A | 11/1997 |
| JP | 2010-104203 A | 5/2010 |
| JP | 2010-134545 A | 6/2010 |

\* cited by examiner

*Primary Examiner* — Richard Isla Rodas
*Assistant Examiner* — David V Henze-Gongola
(74) *Attorney, Agent, or Firm* — Canon USA, Inc. IP Division

(57) ABSTRACT

A power supply apparatus includes a supply unit that supplies power to an external apparatus wirelessly by using a quality factor that indicates the resonance characteristic of the power supply apparatus and a control unit that controls the quality factor.

19 Claims, 17 Drawing Sheets

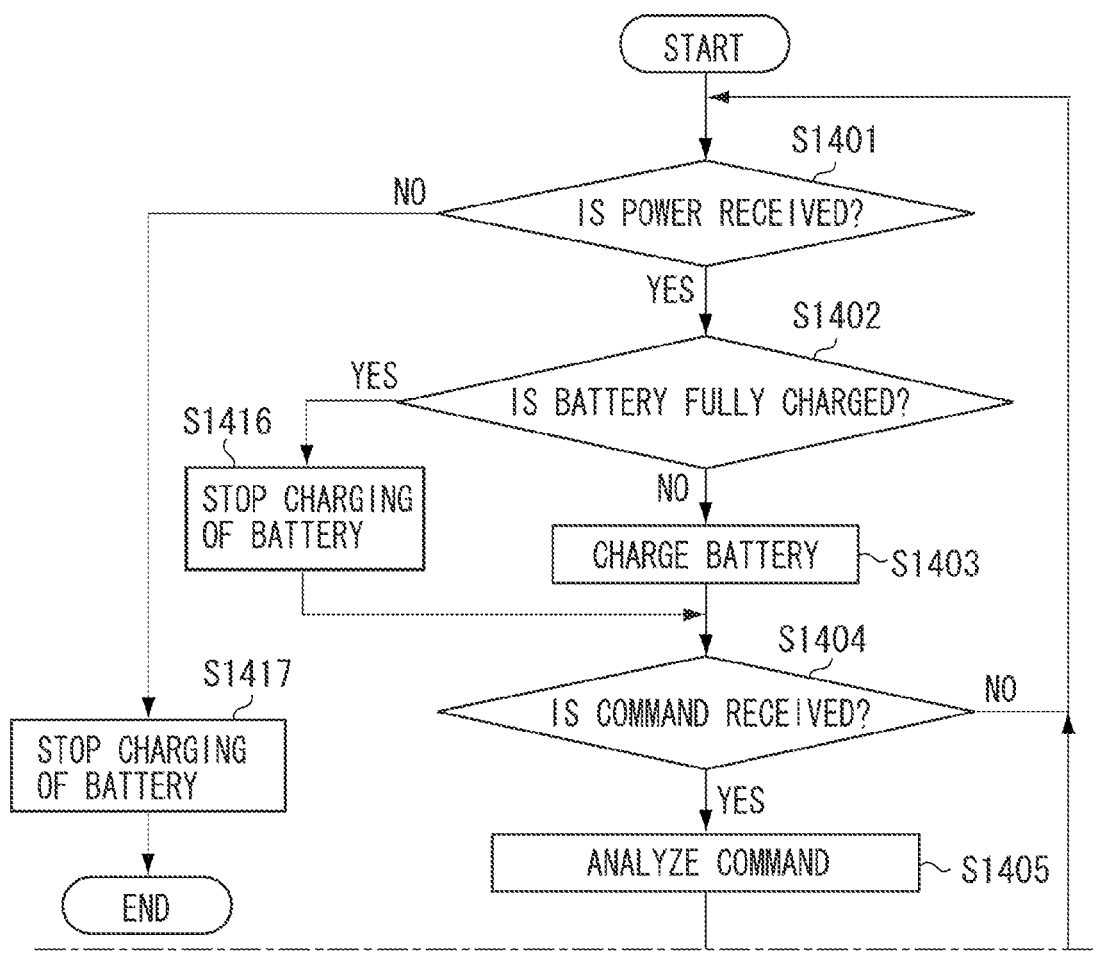

METHOD, APPARATUS, AND COMPUTER-READABLE STORAGE MEDIUM FOR CONTACTLESS POWER SUPPLY AND POWER CONTROL

BACKGROUND OF THE INVENTION

Field of the Invention

Embodiments of the present invention relate to method, apparatus, and computer-readable storage medium for contactless power supply and power control.

Description of the Related Art

In recent years, there has been known a non-contact power supply system including a power supply apparatus for contactlessly supplying power without being connected to a connector and a power receiving apparatus for charging an attached battery by the power supplied from the power supply apparatus. In such a non-contact power supply system, the power supply apparatus may supply power to the power receiving apparatus and transmit a command modulated by an amplitude shift keying (ASK) for controlling the power receiving apparatus.

In such a non-contact power supply system, Japanese Patent Application Laid-Open No. 09-298486 discusses a power receiving apparatus which controls a quality factor (Q) indicating the characteristic of resonance to receive power supplied from a power supply apparatus or receive a command transmitted from the power supply apparatus.

If such a power receiving apparatus receives power from the power supply apparatus, the power receiving apparatus controls to increase the quality factor of the power receiving apparatus. If the power receiving apparatus receives a command transmitted from the power supply apparatus, the power receiving apparatus controls to decrease the quality factor of the power receiving apparatus.

If the power supply apparatus supplies power for charging a battery to the power receiving apparatus, the power supply apparatus increases the quality factor of the power supply apparatus to increase the efficiency of supplying power to the power receiving apparatus.

In this case, even if the power receiving apparatus controls to decrease the quality factor of the power receiving apparatus so as to allow receiving a command transmitted from the power supply apparatus, the power supply apparatus maintains high the quality factor of the power supply apparatus while supplying power to the power receiving apparatus. For this reason, the power supply apparatus may not communicate with the power receiving apparatus using the command.

SUMMARY OF THE INVENTION

One disclosed aspect of the embodiments is directed to a power supply apparatus which changes the quality factor of the power supply apparatus according to power supplied by the power supply apparatus to a power receiving apparatus.

According to an aspect of the embodiments, there is provided a power supply apparatus comprising: a supply unit that wirelessly supplies power to an external apparatus by using a first quality factor that indicates a resonance characteristic of the power supply apparatus, and a control unit that controls the first quality factor so that the first quality factor is greater than a first predetermined value if first power is supplied to the external apparatus, wherein the control unit controls the first quality factor so that the first quality factor is not greater than the first predetermined value if second power is supplied to the external apparatus, the second power is used for transmitting a command to the external apparatus from the power supply apparatus, and the first power is different from the second power.

According to another aspect of the embodiments, there is provided a method for controlling a power supply apparatus, the method comprising: supplying power to an external apparatus wirelessly by using a first quality factor that indicates a resonance characteristic of the power supply apparatus; controlling the first quality factor so that the first quality factor is greater than a first predetermined value if first power is supplied to the external apparatus; and controlling the first quality factor so that the first quality factor is not greater than the first predetermined value if second power is supplied to the external apparatus, wherein the second power is used for transmitting a command to the external apparatus, and the first power is different from the second power.

According to another aspect of the embodiments, there is provided a computer-readable storage medium storing a program executed by a computer, wherein the program for using the computer to perform a method for controlling a power supply apparatus, the method comprising: supplying power to an external apparatus wirelessly by using a first quality factor that indicates a resonance characteristic of the power supply apparatus; controlling the first quality factor so that the first quality factor is greater than a first predetermined value if first power is supplied to the external apparatus; and controlling the first quality factor so that the first quality factor is not greater than the first predetermined value if second power is supplied to the external apparatus, wherein the second power is used for transmitting a command to the external apparatus, and the first power is different from the second power.

Further features and aspects of the embodiments will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 14A is a flow chart illustrating a first part of an example of command transmission process performed by the power receiving apparatus in the third exemplary embodiment.

DESCRIPTION OF THE EMBODIMENTS

Various exemplary embodiments, features, and aspects of the invention will be described in detail below with reference to the drawings One disclosed feature of the embodiments may be described as a process which is usually depicted as a flowchart, a flow diagram, a timing diagram, a structure diagram, or a block diagram. Although a flowchart or a timing diagram may describe the operations or events as a sequential process, the operations may be performed, or the events may occur, in parallel or concurrently. In addition, the order of the operations or events may be re-arranged. A process is terminated when its operations are completed. A process may correspond to a method, a program, a procedure, a method of manufacturing or fabrication, a sequence of operations performed by an apparatus, a machine, or a logic circuit, etc.

Figure 1:
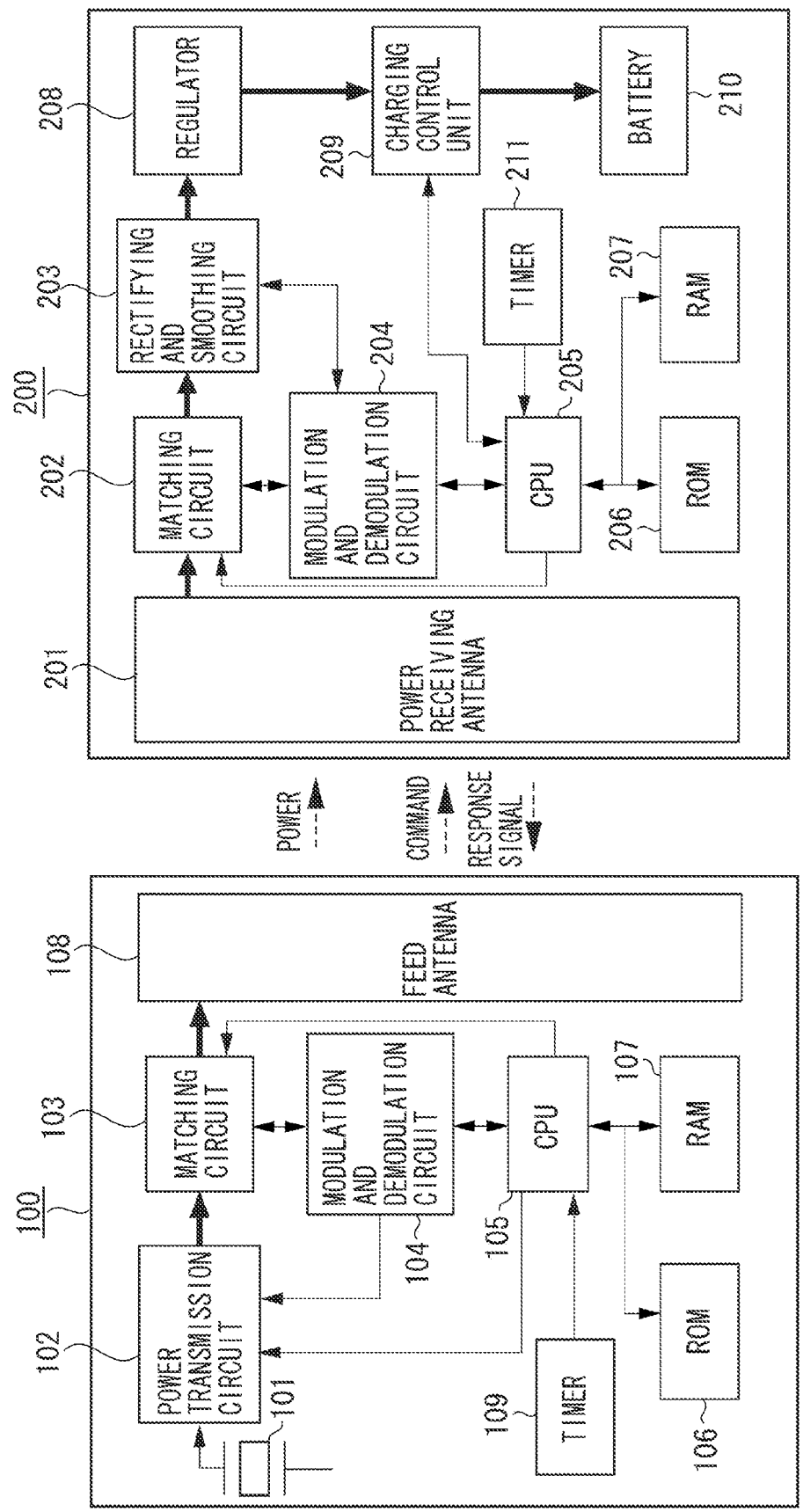
FIG. 1 is a block diagram illustrating an example of a power supply system in first to third exemplary embodiments.

The non-contact power supply system according to a first exemplary embodiment of the present invention includes a power supply apparatus 100 and a power receiving apparatus 200 as illustrated in FIG. 1.

The power supply apparatus 100 contactlessly supplies power to the power receiving apparatus 200 via the feed antenna 108. With respect to the power supply apparatus 100, the power receiving apparatus 200 may be referred to as an external apparatus. The power receiving apparatus 200 contactlessly receives power from the power supply apparatus 100 via a power receiving antenna 201. Furthermore, the power receiving apparatus 200 charges a battery 210 attached thereto by the power received from the power supply apparatus 100.

The power receiving apparatus 200 may be an electronic device operated by electric power supplied from the battery 210. Examples of such electronic device includes a digital camera, a cellular phone, a digital video camera, or a music audio player. Alternatively, the power receiving apparatus 200 may be a movable apparatus like an automobile driven by the battery 210.

The non-contact power supply system according to the first exemplary embodiment may be a system in which the power supply apparatus 100 supplies power to the power receiving apparatus 200 by electromagnetic induction or magnetic field resonance and the power receiving apparatus 200 receives power from the power supply apparatus 100 by electromagnetic induction or magnetic field resonance.

The power receiving apparatus 200 according to the first exemplary embodiment may receive power from the power supply apparatus 100 if the distance between the power supply apparatus 100 and the power receiving apparatus 200 is within a predetermined range. The power receiving apparatus 200 may not receive power from the power supply apparatus 100 if the distance between the power supply apparatus 100 and the power receiving apparatus 200 is not within the predetermined range. The predetermined range refers to a range within which the power supply apparatus 100 and the power receiving apparatus 200 may communicate with each other. The power supply apparatus 100 may include an oscillator 101, a power transmission circuit 102, a matching circuit 103, a modulation and demodulation circuit 104, a central processing unit (CPU) 105, a read-only memory (ROM) 106, a random access memory (RAM) 107, a feed antenna 108, and a timer 109.

The oscillator 101 oscillates a high frequency used for supplying the power receiving apparatus 200 with power corresponding to a target value determined by the CPU 105. The oscillator 101 includes a crystal resonator.

The power transmission circuit 102 generates power to be supplied to the power receiving apparatus 200 via the feed antenna 108 according to the frequency oscillated by the oscillator 101. The power transmission circuit 102 includes a field-effect transistor (FET) (not shown) and generates power to be supplied to the power receiving apparatus 200 by controlling current flowing between the source and the drain of the FET according to the frequency oscillated by the oscillator 101. The power generated in the power transmission circuit 102 is supplied to the matching circuit 103.

The matching circuit 103 is a resonance circuit for matching the impedance between the power transmission circuit 102 and the feed antenna 108 to produce a resonance between the feed antenna 108 and the power receiving antenna 201 by the frequency oscillated by the oscillator 101. The CPU 105 controls the matching circuit 103 to turn the frequency oscillated by the oscillator 101 into a frequency at which the feed antenna 108 and the power receiving antenna 201 resonate with each other. Hereinafter, the frequency at which the feed antenna 108 and the power receiving antenna 201 resonate with each other is referred to as "resonance frequency f".

The resonance frequency f is expressed by the following equation (1), where L1 indicates the inductance of the matching circuit 103 and C1 is the capacitance of the matching circuit 103.

$$f = \frac{1}{2\pi\sqrt{L1C1}} \quad (1)$$

The CPU 105 controls the matching circuit 103 so as to change the inductance L1 of the matching circuit 103 and the capacitance C1 of the matching circuit 103 to match the frequency oscillated by the oscillator 101 to a predetermined resonance frequency f.

The CPU 105 may control the matching circuit 103 so as to change the quality factor Q1 value in order to control power to be supplied to the power receiving apparatus 200. The Q1 value is a value indicating the characteristic of resonance in the power supply apparatus 100 and the sharpness of peak of the resonance frequency f. The Q1 is used by the CPU 105 to control how much power generated by the power transmission circuit 102 is supplied to the power receiving apparatus 200. Hereinafter, a value of the quality factor Q1 is referred to as a "Q1 value".

The Q1 value is expressed by the following equation (2), where R1 is the impedance of the matching circuit 103, L1 is the inductance of the matching circuit 103, and C1 is the capacitance of the matching circuit 103. The value of the inductance L1 in equation (1) corresponds to that of the inductance L1 in equation (2). Furthermore, the value of the capacitance C1 in equation (1) corresponds to that of the capacitance C1 in equation (2).

$$Q1 = \frac{1}{R1}\sqrt{\frac{L1}{C1}} \quad (2)$$

If a value of the impedance R1 of the resistance is large, the Q1 value decreases. If a value of the impedance R1 of the resistance is small, the Q1 value increases. If a value of the capacitance C1 is large, the Q1 value decreases. If a value of the capacitance C1 is small, the Q1 value increases. If a value of the inductance L1 is small, the Q1 value decreases. If a value of the inductance L1 is large, the Q1 value increases.

The CPU 105 controls the Q1 value by using predetermined values A1, A2, and A3 recorded in the RAM 107. The relationship among the predetermined values A1, A2, and A3 is represented by A3>A1>A2.

If the power supply apparatus 100 transmits a command for controlling the power receiving apparatus 200 to the power receiving apparatus 200, the CPU 105 controls the matching circuit 103 so that the Q1 value is equal to or smaller than the predetermined value A1 and is equal to or greater than the predetermined value A2. In this case, the efficiency of supplying the power generated by the power transmission circuit 102 to the power receiving apparatus 200 decreases because heat loss increases in the matching circuit 103, so that the power supply apparatus 100 may not supply a large power to the power receiving apparatus 200. If the power supply apparatus 100 supplies a large power to the power receiving apparatus 200, the CPU 105 controls the matching circuit 103 so that the Q1 value is equal to or smaller than the predetermined value A3 and is greater than the predetermined value A1. In this case, the efficiency of communication between the power supply apparatus 100 and the power receiving apparatus 200 decreases, so that the power supply apparatus 100 may not transmit the command for controlling the power receiving apparatus 200 to the power receiving apparatus 200.

Figure 2:
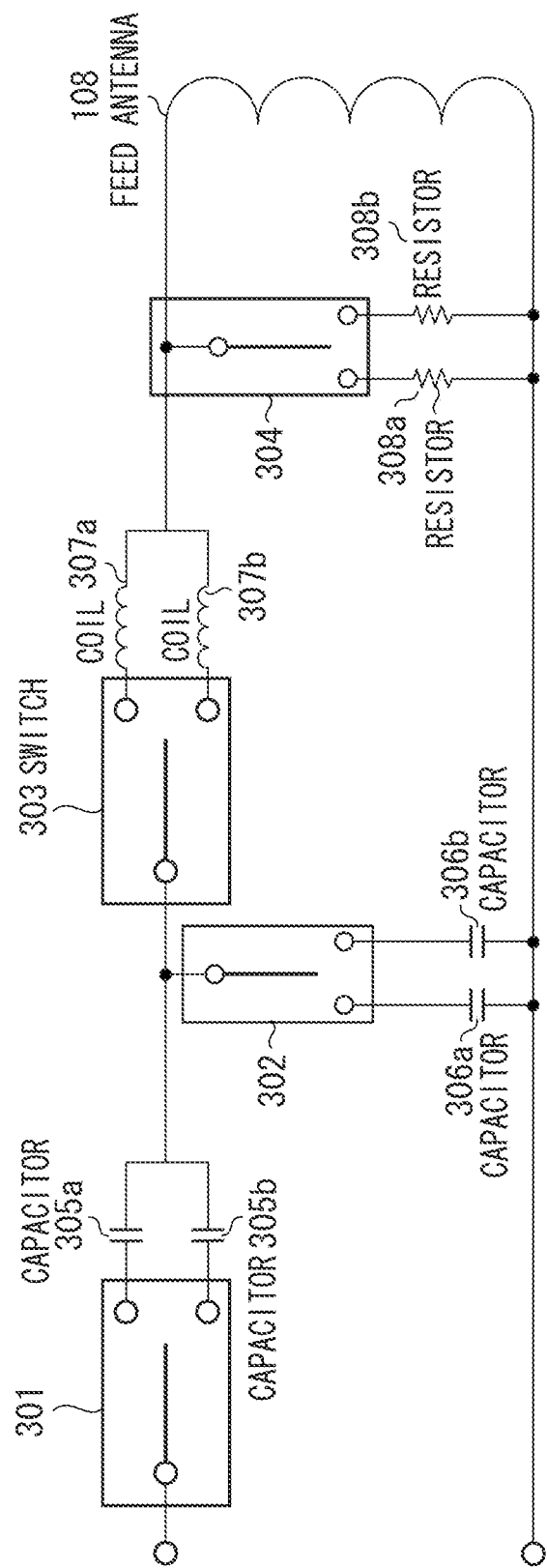
FIG. 2 illustrates an example of a configuration of a matching circuit of the power supply apparatus in the first to third exemplary embodiments.

FIG. 2 illustrates a configuration of the matching circuit 103 in the power supply apparatus 100 according to the first exemplary embodiment. The matching circuit 103 illustrated in FIG. 2 includes capacitors 305a, 305b, 306a, and 306b, coils 307a and 307b, and resistors 308a and 308b. The matching circuit 103 illustrated in FIG. 2 further includes switches 301, 302, 303, and 304 for matching the impedance between the power transmission circuit 102 and the feed antenna 108.

The capacitors 305a, 305b, 306a, and 306b are used for matching the impedance. The capacitors 306a, and 306b are used for adjusting the resonance frequency f obtained by equation (1). A value of the capacitor 305a is greater than a value of the capacitor 305b. A value of the capacitor 306a is greater than a value of the capacitor 306b.

The coils 307a and 307b are used for adjusting the resonance frequency f obtained by equation (1). A value of the coil 307a is greater than a value of the coil 307b.

A value of the resistor 308a is greater than a value of the resistor 308b.

The switch 301 selectively switches between the capacitors 305a and 305b. The switch 302 selectively switches between the capacitors 306a and 306b. The switch 303 selectively switches between the coils 307a and 307b. The switch 304 selectively switches between the resistors 308a and 308b. The switches 301 to 304 are those for selectively switching the terminals, but not limited to those. For example, the switches 301 to 304 may be relay switches or use switches included in an integrated circuit (IC). The switches 301 to 304 are controlled by the CPU 105.

Although the matching circuit 103 includes capacitors 305a, 305b, 306a, and 306b, the matching circuit 103 may further include additional capacitors as well. The matching circuit 103 may further include additional coils as well as the coils 307a and 307b or further include additional resistors as well as the resistors 308a and 308b. Although the resistors 308a and 308b are connected in parallel to the feed antenna 108, they may be connected in series thereto.

The matching circuit 103 may also detect change in current flowing through the feed antenna 108 and voltage supplied to the feed antenna 108.

The modulation and demodulation circuit 104 modulates power generated by the power transmission circuit 102 according to a predetermined protocol to transmit the command being data for controlling the power receiving apparatus 200 to the power receiving apparatus 200. The predetermined protocol is a communication protocol such as International Organization for Standardization (ISO) 14443 or ISO 1563 used for radio frequency identification (RFID), for example. The modulation and demodulation circuit 104 converts the power generated by the power transmission circuit 102 to a pulse signal as a command used for communicating with the power receiving apparatus 200 and transmits the pulse signal to the power receiving apparatus 200. The pulse signal transmitted to the power receiving apparatus 200 is interpreted by the power receiving apparatus 200 and recognized as bit data including information of "1" and "0." The command includes information for identifying a destination and a command code indicating operation controlled by the command.

The modulation and demodulation circuit 104 converts the power generated by the power transmission circuit 102 to a pulse signal by Amplitude Shift Keying (ASK) modulation using amplitude displacement. The ASK modulation uses amplitude displacement and is used for communication between an IC card and an IC card reader which contactlessly/wirelessly communicates with the IC card. The modulation and demodulation circuit 104 modulates power generated by the power transmission circuit 102 by a predetermined modulation factor (i.e., degree of amplitude modulation) indicated by the Q1 value. The modulation and demodulation circuit 104 may change the amplitude of power generated by the power transmission circuit 102 by switching an analog multiplier and a load resistor included in the modulation and demodulation circuit 104. The modulation and demodulation circuit 104 includes a coding circuit using a predetermined coding system.

If the modulation and demodulation circuit 104 transmits the command to the power receiving apparatus 200, the modulation and demodulation circuit 104 may demodulate a response signal in response to the command transmitted to the power receiving apparatus 200 from the power receiving apparatus 200 according to change in current flowing through the feed antenna 108. The change in current flowing through the feed antenna 108 is detected by the matching circuit 103. Thereby, the modulation and demodulation circuit 104 may receive a response signal in response to the command transmitted to the power receiving apparatus 200 from the power receiving apparatus 200 by a load modulation method. The modulation and demodulation circuit 104 transmits the command to the power receiving apparatus 200 according to instructions from the CPU 105. If the modulation and demodulation circuit 104 receives the response signal from the power receiving apparatus 200, the modulation and demodulation circuit 104 supplies the CPU 105 with the received response signal.

If the power supply apparatus 100 is connected to an alternating current (AC) power supply (not illustrated), the CPU 105 controls each unit in the power supply apparatus 100 by power supplied from the AC power supply. The CPU 105 executes a computer program stored in the ROM 106, or an appropriate memory device, to control the operation of each unit in the power supply apparatus 100. The CPU 105 controls the power transmission circuit 102 to control power to be supplied to the power receiving apparatus 200. The CPU 105 controls the modulation and demodulation circuit 104 to transmit the command to the power receiving apparatus 200. The CPU 105 controls the matching circuit 103 to cause the power supply apparatus 100 to resonate with the power receiving apparatus 200. The CPU 105 controls the matching circuit 103 to change the Q1 value between in transmitting the command and in supplying only the power. The CPU 105 has a communication unit (not illustrated) for communicating with the power receiving apparatus 200 using a command or a response to the command. The communication unit (not illustrated) controls the oscillator 101, the power transmission circuit 102, the matching circuit 103, and the modulation and demodulation circuit 104 to communicate with the power receiving apparatus 200.

The ROM 106 stores information such as computer programs or instructions for controlling the operation of each unit in the power supply apparatus 100 and parameters related to the operation of each unit.

The RAM 107 is a rewritable memory and temporarily stores information such as computer programs for controlling the operation of each unit in the power supply apparatus 100 and parameters related to the operation of each unit and information received by the modulation and demodulation circuit 104 from the power receiving apparatus 200. The RAM 107 stores information indicating the present Q1 value and the resonance frequency f.

The feed antenna 108 may be a loop antenna wound several turns.

The timer 109 measures the present time and time regarding the operation performed in each unit.

The power receiving apparatus 200 is described below. Referring to FIG. 1, the power receiving apparatus 200 includes the power receiving antenna 201, a matching circuit 202, a rectifying and smoothing circuit 203, a modulation and demodulation circuit 204, a CPU 205, a ROM 206, a RAM 207, a regulator 208, a charging control unit 209, a battery 210, and a timer 211. The power receiving apparatus 200 may include more or less than the above components.

The power receiving antenna 201 may be a loop antenna wound several turns and receives power supplied from the power supply apparatus 100.

The matching circuit 202 serves as a resonance circuit for matching impedance by controlling a value of inductance of the matching circuit 202 and a value of capacitance of the matching circuit 202 so that the power receiving antenna 201 resonates at the same frequency as the resonance frequency f of the power supply apparatus 100.

The rectifying and smoothing circuit 203 removes a command and noise from the power received by the power receiving antenna 201 to generate a direct current power for charging the battery 210. The rectifying and smoothing circuit 203 supplies the generated direct current power to the regulator 208. The rectifying and smoothing circuit 203 supplies the modulation and demodulation circuit 204 with the command removed from the power received by the power receiving antenna 201. The rectifying and smoothing circuit 203 may include a diode and generates a direct current power by any one of full-wave rectification or half-wave rectification.

The modulation and demodulation circuit 204 analyzes the command supplied from the rectifying and smoothing circuit 203 according to the communication protocol previously determined with the power supply apparatus 100 and supplies the result of analysis of the command to the CPU 205.

The CPU 205 determines what the received command is according to the result of analysis supplied from the modulation and demodulation circuit 204 and performs the operation specified by a command code corresponding to the received command.

The CPU 205 executes the computer program or instructions stored in the ROM 206 to control the operation of each unit in the power receiving apparatus 200.

The CPU 205 controls the matching circuit 202 to cause the power receiving apparatus 200 to resonate with the power supply apparatus 100. The CPU 205 has a communication unit (not illustrated) for communicating with the power supply apparatus 100 using a command or a response to the command. The communication unit (not illustrated) controls the matching circuit 202, the rectifying and smoothing circuit 203, and the modulation and demodulation circuit 204 to communicate with the power supply apparatus 100.

The ROM 206 stores information such as computer programs or instructions for controlling the operation of each unit in the power receiving apparatus 200 and parameters related to the operation of each unit. The ROM 206 stores the identification information and capacity information about the power receiving apparatus 200. The identification information about the power receiving apparatus 200 includes the identification ID, manufacturer's name, apparatus name, and production data of the power receiving apparatus 200.

The capacity information about the power receiving apparatus 200 includes information indicating how much power the power receiving apparatus 200 may receive and information indicating that the power receiving apparatus 200 may receive a command from the power supply apparatus 100 by how much the Q1 value.

The RAM 207 is a rewritable memory and temporarily stores information such as computer programs or instructions for controlling the operation of each unit in the power receiving apparatus 200 and parameters related to the operation of each unit and information received by the modulation and demodulation circuit 204 from the power receiving apparatus 200.

The regulator 208 controls the voltage of direct current power supplied from the rectifying and smoothing circuit 203 so that the voltage becomes equal to the voltage set by the CPU 205. The regulator 208 may be a switching regulator or linear regulator. The direct current power supplied from the rectifying and smoothing circuit 203 and controlled so as to be equal to the voltage set by the CPU 205 via the regulator 208 is supplied to the charging control unit 209. The regulator 208 controls the voltage of power supplied from the battery 210 so that the voltage becomes equal to the voltage set by the CPU 205. The direct current power supplied from the battery 210 and controlled so as to be equal to the voltage set by the CPU 205 via the regulator 208 is supplied at least to the CPU 205, the ROM 206, or the RAM 207.

If the charging control unit 209 is supplied with the direct current power from the regulator 208, the charging control unit 209 charges the battery 210. The voltage for charging the battery 210 is referred to as "charging voltage." The current by which the power receiving apparatus 200 charges the battery 210 is referred to as "charging current."

When the battery 210 starts charging, the charging control unit 209 performs a constant current control so that the charging current flowing into the battery 210 becomes equal to a predetermined current value. While the charging control unit 209 performs the constant current control, the charging voltage supplied to the battery 210 increases with the time elapsing after the constant current control is performed. When the charging voltage reaches the predetermined voltage value while the charging control unit 209 performs the constant current control, the charging control unit 209 performs a constant voltage control so that the charging voltage supplied to the battery 210 becomes equal to a predetermined voltage value. While the charging control unit 209 performs the constant voltage control, the charging current flowing into the battery 210 decreases with the time elapsing after the constant voltage control is performed. Charging the battery 210 is ended when the charging current flowing into the battery 210 is reduced to nearly zero, so that the charging control unit 209 stops charging the battery 210. The charging control unit 209 periodically detects information indicating the remaining capacity of the attached battery 210 and supplies the information to the CPU 205. The CPU 205 stores the information that indicates the remaining capacity of the battery 210 (hereinafter, referred to as "information indicating remaining capacity") and is supplied from the charging control unit 209 into the RAM 207.

The battery 210 may be detachable from the power receiving apparatus 200. The battery 210 may be a chargeable secondary battery and a lithium ion battery, for example.

The timer 211 measures the present time and time regarding the operation performed in each unit.

The non-contact power supply system including the power supply apparatus 100 and the power receiving apparatus 200 may be a system in which power is supplied from the power supply apparatus 100 to the power receiving apparatus 200 by wireless.

In the first exemplary embodiment, a power supply process performed by the power supply apparatus 100 is described below using a flow chart in FIG. 3. The power supply process may be realized by the CPU 105 executing the computer programs or instructions stored in the ROM 106 or an appropriate memory device.

Figure 3:
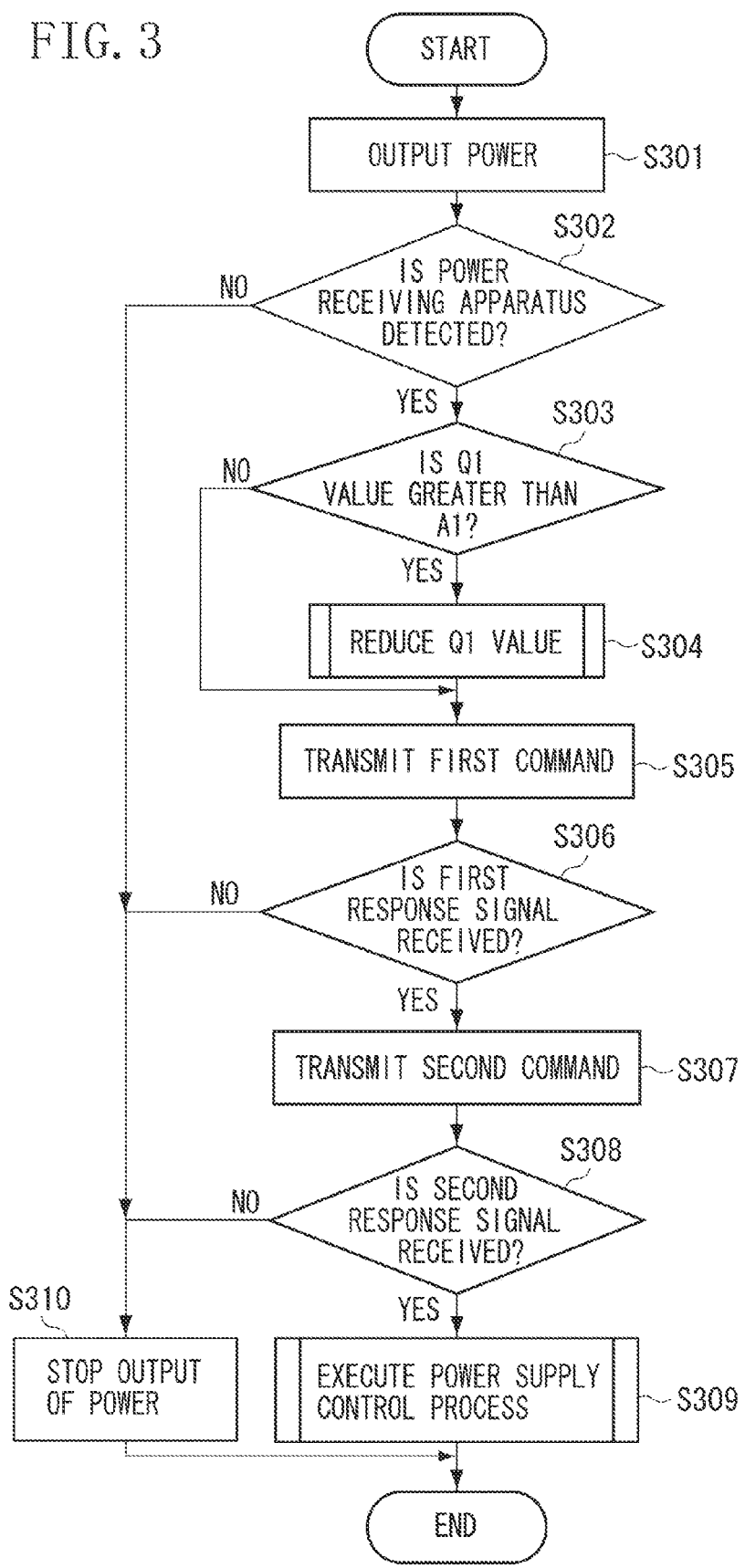
FIG. 3 is a flow chart illustrating an example of power supply process performed by the power supply apparatus in the first exemplary embodiment.

The power supply process illustrated in FIG. 3 is performed in the power supply apparatus 100 when the operation mode of the power supply apparatus 100 is turned into a mode in which power is supplied to an external apparatus. If the power supply process is performed by the CPU 105, the switch 301 is connected to one of the capacitor 305a and the capacitor 305b and the switch 302 is connected to one of the capacitor 306a and the capacitor 306b. Furthermore, if the power supply process is performed by the CPU 105, the switch 303 in the matching circuit 103 is connected to one of the coil 307a and the coil 307b and the switch 304 is connected to one of the resistor 308a and the resistor 308b.

In step S301, the CPU 105 controls the oscillator 101, the power transmission circuit 102, and the matching circuit 103 so that power is supplied in order to detect whether the distance between the power supply apparatus 100 and the power receiving apparatus 200 is within a range in which power may be received from the power supply apparatus 100. In this case, the process proceeds from step S301 to step S302.

In step S302, the CPU 105 detects whether the power receiving apparatus 200 is within a range in which the power receiving apparatus 200 may receive power from the power supply apparatus 100 based on the change in current flowing through the feed antenna 108 detected by the matching circuit 103. If the CPU 105 determines that the power receiving apparatus 200 is not within the range in which the power receiving apparatus 200 may receive power from the power supply apparatus 100 (NO in step S302), the process proceeds from step S302 to step S310. If the CPU 105 determines that the power receiving apparatus 200 is within the range in which the power receiving apparatus 200 may receive power from the power supply apparatus 100 (YES in step S302), the process proceeds from step S302 to step S303.

In step S303, the CPU 105 determines whether the Q1 value stored in the RAM 107 is greater than the predetermined value A1. The predetermined value A1 is the maximum threshold if the power supply apparatus 100 may transmit a command to the power receiving apparatus 200. If the Q1 value is greater than the predetermined value A1, the power supply apparatus 100 may supply large power to other power receiving apparatus except the power receiving apparatus 200. In this case, since the power supply apparatus 100 may not transmit a command for communicating with the newly detected power receiving apparatus 200, the Q1 value needs to be reduced to the predetermined value A1 or smaller to transmit the command to the power receiving apparatus 200. If the CPU 105 determines that the Q1 value is greater than the predetermined value A1 (YES in step S303), the process proceeds from step S303 to step S304.

If the Q1 value is equal to smaller than the predetermined value A1, the power supply apparatus 100 may transmit a command for communicating with the newly detected power receiving apparatus 200. If the CPU 105 determines that the Q1 value is equal to smaller than the predetermined value A1 (NO in step S303), the process proceeds from step S303 to step S305.

In step S304, the CPU 105 performs process for reducing the Q1 value. The process for reducing the Q1 value is described below. If the CPU 105 performs process for reducing the Q1 value, the process proceeds from step S304 to step S305.

In step S305, the CPU 105 controls the modulation and demodulation circuit 104 to transmit the command for acquiring the identification information of the power receiving apparatus 200 from the power receiving apparatus 200 to the power receiving apparatus 200. The identification information about the power receiving apparatus 200 includes the identification ID, apparatus name, and manufacturer's name of the power receiving apparatus 200.

Hereinafter, the command for acquiring the identification information of an external apparatus such as the power receiving apparatus 200 is referred to as "first command." If the first command is transmitted to the power receiving apparatus 200, the process proceeds from step S305 to step S306.

In step S306, the CPU 105 determines whether the modulation and demodulation circuit 104 receives a response signal in response to the first command. If the CPU 105 determines that the modulation and demodulation circuit 104 receives a response signal in response to the first command (YES in step S306), the CPU 105 acquires the identification information of the power receiving apparatus 200 from the modulation and demodulation circuit 104 and stores the identification information in the RAM 107. In this case (YES in step S306), the process proceeds from step S306 to step S307.

If the CPU 105 determines that the modulation and demodulation circuit 104 does not receive a response signal in response to the first command (NO in step S306), the process proceeds from step S306 to step S310. Hereinafter, the response signal in response to the first command is referred to as "first response signal."

In step S307, the CPU 105 controls the modulation and demodulation circuit 104 to transmit the command for acquiring the capacity information of the power receiving apparatus 200 from the power receiving apparatus 200 to the power receiving apparatus 200. The capacity information of the power receiving apparatus 200 includes information indicating that how much power at most the power receiving apparatus 200 may receive if the power receiving apparatus 200 receives only power from the power supply apparatus 100 without receiving a command. Furthermore, the capacity information of the power receiving apparatus 200 includes information indicating that how much power at most the power receiving apparatus 200 may receive if the power receiving apparatus 200 may receive a command from the power supply apparatus 100. The capacity information of the power receiving apparatus 200 may include information indicating the maximum Q1 value if the power receiving apparatus 200 receives only power from the power supply apparatus 100 without receiving a command.

The capacity information of the power receiving apparatus 200 may include information indicating the maximum Q1 value if the power receiving apparatus 200 receives a command from the power supply apparatus 100.

Hereinafter, the command for acquiring the capacity information of an external apparatus such as the power receiving apparatus 200 is referred to as "second command." If the second command is transmitted to the power receiving apparatus 200, the process proceeds from step S307 to step S308.

In step S308, the CPU 105 determines whether the modulation and demodulation circuit 104 receives a response signal in response to the second command. If the CPU 105 determines that the modulation and demodulation circuit 104 receives a response signal in response to the second command (YES in step S308), the CPU 105 acquires the capacity information of the power receiving apparatus 200 from the modulation and demodulation circuit 104 and stores the identification information in the RAM 107. In this case (YES in step S308), the process proceeds from step S308 to step S309.

If the CPU 105 determines that the modulation and demodulation circuit 104 does not receive a response signal in response to the second command (NO in step S308), the process proceeds from step S308 to step S310. Hereinafter, the response signal in response to the second command is referred to as "second response signal."

In step S309, the CPU 105 performs power supply control process for controlling power to supply to the power receiving apparatus 200 using the Q1 value. The power supply control process is described below. If the power supply control process is performed, the process is ended.

In step S310, the CPU 105 controls the oscillator 101, the power transmission circuit 102, the matching circuit 103 to stop supplying power to the power receiving apparatus 200. In this case, the process is ended. If the power receiving apparatus 200 does not transmit the first response signal (NO in step S306), the CPU 105 may stop supplying power to the power receiving apparatus 200 by the process in step S310. If the power receiving apparatus 200 does not transmit the second response signal (NO in step S308), the CPU 105 may stop supplying power to the power receiving apparatus 200 by the process in step S310. In step S302, although the CPU 105 detects that the power receiving apparatus 200 is within the range in which the power receiving apparatus 200 may receive power from the power supply apparatus 100 based on the change in current flowing through the feed antenna 108, the CPU 105 may detect that based on the change in voltage across the feed antenna 108. Alternatively, the CPU 105 may detect that the power receiving apparatus 200 is within the range in which the power receiving apparatus 200 may receive power from the power supply apparatus 100 based on change in a standing wave ratio (SWR). If power is supplied to a power receiving apparatus except the power receiving apparatus 200, the process for supplying power may be continued without the process in step S310 being performed.

The CPU 105 may detect that the power receiving apparatus 200 is within the range in which the power receiving apparatus 200 may receive power from the power supply apparatus 100 by periodically transmitting a command for confirming the existence of the power receiving apparatus 200.

The power supply control process performed by the power supply apparatus 100 in the process of step S309 illustrated in FIG. 3 in the first exemplary embodiment is described below using the flow chart in FIG. 4. The power supply control process may be realized by the CPU 105 executing the computer program or instructions stored in the ROM 106. If the power supply control process is performed by the CPU 105, the switch 301 is connected to one of the capacitor 305a and the capacitor 305b and the switch 302 is connected to one of the capacitor 306a and the capacitor 306b. Furthermore, if the power supply control process is performed by the CPU 105, the switch 303 in the matching circuit 103 is connected to one of the coil 307a and the coil 307b and the switch 304 is connected to one of the resistor 308a and the resistor 308b.

In step S401, the CPU 105 controls the modulation and demodulation circuit 104 to transmit the command for acquiring information indicating a charging state of the power receiving apparatus 200 from the power receiving apparatus 200 to the power receiving apparatus 200. The information indicating the charging state of the power receiving apparatus 200 includes at least one of information indicating the remaining capacity of the battery 210 attached to the power receiving apparatus 200, information indicating the charging current of the battery 210, and information indicating the charging voltage of the battery 210. Hereinafter, the control command for acquiring information indicating the charging state of an external apparatus such as the power receiving apparatus 200 is referred to as "third command." If the third command is transmitted to the power receiving apparatus 200, the process proceeds from step S401 to S402. In step S402, the CPU 105 determines whether the modulation and demodulation circuit 104 receives the response signal in response to the third command. If the CPU 105 determines that the modulation and demodulation circuit 104 receives the response signal in response to the third command (YES in step S402), the CPU 105 acquires the information indicating the charging state of the power receiving apparatus 200 from the modulation and demodulation circuit 104 and stores the information in the RAM 107. In this case (YES in step S402), the process proceeds from step S402 to step S403.

If the CPU 105 determines that the modulation and demodulation circuit 104 does not receive the response signal in response to the third command (NO in step S402), the process is ended. In this case, the power receiving apparatus 200 may be in a state where the power receiving apparatus 200 does not perform charging, so that the CPU 105 does not change the Q1 value stored in the RAM 107. Hereinafter, the response signal in response to the third command is referred to as "third response signal."

In step S403, the CPU 105 determines whether the charging state of the power receiving apparatus 200 is changed depending on whether information indicating the charging state of the power receiving apparatus 200 acquired from the power receiving apparatus 200 is changed. If the information indicating the charging state of the power receiving apparatus 200 previously acquired from the power receiving apparatus 200 is stored in the RAM 107, the information indicating the charging state of the power receiving apparatus 200 acquired in step S402 is compared with the information indicating the charging state of the power receiving apparatus 200 stored in the RAM 107. As a result of the comparison, the CPU 105 determines that the information indicating the charging state of the power receiving apparatus 200 newly acquired from the power receiving apparatus 200 is changed, the CPU 105 determines that the charging state of the power receiving apparatus 200 is changed. As a result of the comparison, the CPU 105 determines that the information indicating the charging state of the power receiving apparatus 200 newly acquired from the power receiving apparatus 200 is not changed, the CPU 105 determines that the charging state of the power receiving apparatus 200 is not changed. In step S402, if the information indicating the charging state of the power receiving apparatus 200 is received for the first time from the power receiving apparatus 200, the CPU 105 determines that the charging state of the power receiving apparatus 200 is changed. The charging state of the power receiving apparatus 200 refers to a state indicating the remaining capacity of the battery 210 attached to the power receiving apparatus 200 and a state of charging control by the charging control unit 209 in the power receiving apparatus 200.

If the CPU 105 determines that the charging state of the power receiving apparatus 200 is not changed (NO in step S403), the process is ended. In this case, the power receiving apparatus 200 may finish charging into the battery 210 because the battery 210 is fully charged, so that the CPU 105 does not change the Q1 value stored in the RAM 107. If the CPU 105 determines that the charging state of the power receiving apparatus 200 is changed (YES in step S403), the process proceeds from step S403 to step S404.

In step S404, the CPU 105 determines whether the power supplied to the power receiving apparatus 200 is decreased based on the information indicating the charging state of the power receiving apparatus 200 acquired in step S402. For example, if the charging control unit 209 performs the constant current control when the power receiving apparatus 200 starts charging the battery 210, the charging control unit 209 performs control not to suddenly increase the charging voltage supplied to the battery 210. In this case, even if the power supplied from the power supply apparatus 100 is small, the power receiving apparatus 200 may charge the battery 210 without decreasing the efficiency of charge into the battery 210. For this reason, the CPU 105 controls the Q1 value stored in the RAM 107 to decrease the power supplied to the power receiving apparatus 200.

If the charging control unit 209 performs the constant voltage control and completes the charge of the battery 210 while the power receiving apparatus 200 is charging the battery 210, the charging control unit 209 performs control not to overcharge the battery 210. Also, in this case, even if the power supplied from the power supply apparatus 100 is small, the power receiving apparatus 200 may charge the battery 210 without decreasing the efficiency of charge into the battery 210. For this reason, the CPU 105 controls the Q1 value to reduce the power supplied to the power receiving apparatus 200.

The CPU 105 determines whether the power receiving apparatus 200 is in a state of starting the charge of the battery 210 or completing the charge of the battery 210 according to the information indicating the charging state of the power receiving apparatus 200 acquired in step S402.

The CPU 105 determines that the power supplied to the power receiving apparatus 200 is decreased if the power receiving apparatus 200 is in a state of starting the charge of the battery 210 or completing the charge of the battery 210. The CPU 105 determines that the power supplied to the power receiving apparatus 200 is not decreased, in other words, the power supplied to the power receiving apparatus 200 is made greater than the present power if the power receiving apparatus 200 is in a state of neither starting the charge of the battery 210 nor completing the charge of the battery 210.

The CPU 105 may determine whether the power receiving apparatus 200 is in a state of starting the charge of the battery 210 using the information indicating the charge current and the charging voltage included in the information indicating the charging state of the power receiving apparatus 200. For example, if it is detected that the charging current of the battery 210 is almost constant and the charging voltage of the battery 210 is a half of or smaller than a predetermined voltage if the constant current control is performed by the power receiving apparatus 200, the CPU 105 determines that the power receiving apparatus 200 is in a state of starting the charge of the battery 210. If it is detected that the charging current of the battery 210 is almost constant and the charging voltage of the battery 210 is greater than a half of a predetermined voltage if the constant current control is performed by the power receiving apparatus 200, the CPU 105 determines that the power receiving apparatus 200 is not in a state of starting the charge of the battery 210.

The CPU 105 may determine whether the power receiving apparatus 200 is in a state of completing the charge of the battery 210 using the information indicating the charge current of the battery 210 and the charging voltage of the battery 210 included in the information indicating the charging state of the power receiving apparatus 200. The CPU 105 may determine whether the power receiving apparatus 200 is in a state of completing the charge of the battery 210 using the information indicating the remaining capacity of the battery 210 included in the information indicating the charging state of the power receiving apparatus 200. For example, if it is detected that the charging voltage of the battery 210 is almost constant and the charging current of the battery 210 is a half of or smaller than a predetermined current if the constant voltage control is performed by the power receiving apparatus 200, the CPU 105 determines that the power receiving apparatus 200 is in a state of completing the charge of the battery 210. If it is detected that the charging voltage of the battery 210 is almost constant and the charging current of the battery 210 is greater than a half of a predetermined current if the constant voltage control is performed by the power receiving apparatus 200, the CPU 105 determines that the power receiving apparatus 200 is not in a state of completing the charge of the battery 210. For example, if the remaining capacity of the battery 210 is 80% or more of the overcharge state, the CPU 105 may determine that the power receiving apparatus 200 is in a state of completing the charge of the battery 210. If the remaining capacity of the battery 210 is lower than 80% of the overcharge state, the CPU 105 may determine that the power receiving apparatus 200 is not in a state of completing the charge of the battery 210.

If the CPU 105 determines that the power supplied to the power receiving apparatus 200 is decreased (YES in step S404), the process proceeds from step S404 to step S405. If the CPU 105 determines that the power supplied to the power receiving apparatus 200 is not decreased (NO in step S404), the process proceeds from step S404 to step S406.

In step S405, as is the case with the process in step S304, the CPU 105 performs the process for decreasing the Q1 value stored in the RAM 107. If the process for decreasing the Q1 value is performed, the process is ended.

In step S406, the CPU 105 performs the process for increasing the Q1 value stored in the RAM 107. The process for increasing the Q1 value is described below. If the process for increasing the Q1 value is performed by the CPU 105, the process is ended.

The determination in step S404 as to whether the power supplied to the power receiving apparatus 200 is decreased may be made as to whether the modulation and demodulation circuit 104 receives the command for requesting the power supplied to the power receiving apparatus 200 to be decreased from the power receiving apparatus 200. In this case, if the modulation and demodulation circuit 104 receives the command for requesting the power supplied to the power receiving apparatus 200 to be decreased from the power receiving apparatus 200, the CPU 105 determines that the power supplied to the power receiving apparatus 200 is decreased. In this case, if the modulation and demodulation circuit 104 does not receive the command for requesting the power supplied to the power receiving apparatus 200 to be decreased from the power receiving apparatus 200, the CPU 105 determines that the power supplied to the power receiving apparatus 200 is not decreased, i.e., increased. The process for decreasing the Q1 value in step S405 is performed in a similar manner as that in step S304.

The process for decreasing the Q1 value stored in the RAM 107 performed by the power supply apparatus 100 in the power supply process of step S304 illustrated in FIG. 3 in the first exemplary embodiment is described below using the flow chart in FIG. 5.

The process for decreasing the Q1 value may be realized by the CPU 105 executing the computer program or instructions stored in the ROM 106.

In step S501, the CPU 105 controls the switch 304 so that the Q1 value stored in the RAM 107 becomes equal to or smaller than the predetermined value A1. For example, if the switch 304 is connected to the resistor 308a, the CPU 105 controls the switch 304 so that the switch 304 is connected to the resistor 308b from the resistor 308a.

If the Q1 value stored in the RAM 107 is already equal to or smaller than the predetermined value A1, the CPU 105 controls the switch 304 so that the switch 304 is not switched. If the switch 304 is controlled so that the Q1 value becomes equal to or smaller than the predetermined value A1, the process proceeds from step S501 to step S502.

In step S502, the CPU 105 determines whether the Q1 value stored in the RAM 107 is equal to or smaller than the predetermined value A1 and equal to or greater than the predetermined value A2. The predetermined value A2 is the minimum threshold at which the power supply apparatus 100 may transmit a command to the power receiving apparatus 200. The predetermined value A2 is the threshold for the Q1 value.

If the Q1 value stored in the RAM 107 of the power supply apparatus 100 is equal to or smaller than the predetermined value A1 and equal to or greater than the predetermined value A2, the power supply apparatus 100 may communicate with the power receiving apparatus 200 by transmitting the command to the power receiving apparatus 200. However, if the Q1 value stored in the RAM 107 of the power supply apparatus 100 is greater than the predetermined value A1, the power supply apparatus 100 may not communicate with the power receiving apparatus 200 because the power supply apparatus 100 may not transmit the command to the power receiving apparatus 200. Similarly, if the Q1 value stored in the RAM 107 of the power supply apparatus 100 is smaller than the predetermined value A2, the power supply apparatus 100 may not communicate with the power receiving apparatus 200 because the power supply apparatus 100 may not transmit the command to the power receiving apparatus 200.

The predetermined values A1 and A2 may be the ones set in the RAM 107 by the CPU 105. If the CPU 105 determines that the Q1 value is equal to or smaller than the predetermined value A1 and equal to or greater than the predetermined value A2 (YES in step S502), the CPU 105 updates the Q1 value stored in the RAM 107 in step S504 and the process is ended. If the CPU 105 determines that the Q1 value is neither equal to nor smaller than the predetermined value A1 (NO in step S502), the process proceeds from step S502 to step S503. If the CPU 105 determines that the Q1 value is neither equal to nor greater than the predetermined value A2 (NO in step S502), the process also proceeds from step S502 to step S503.

In step S503, the CPU 105 controls the switch 304 so that the Q1 value becomes equal to or greater than the predetermined value A2. If the switch 304 is controlled so that the Q1 value becomes equal to or greater than the predetermined value A2, the process returns from step S503 to step S501.

The CPU 105 may set the predetermined value A1 according to the information indicating the maximum Q1 value in receiving the command from the power supply apparatus 100 included in the capacity information acquired from the power receiving apparatus 200. The CPU 105 may set the predetermined value A2 according to the information indicating the minimum Q1 value if the power supply apparatus 100 transmits the command to the power receiving apparatus 200.

Figure 6:
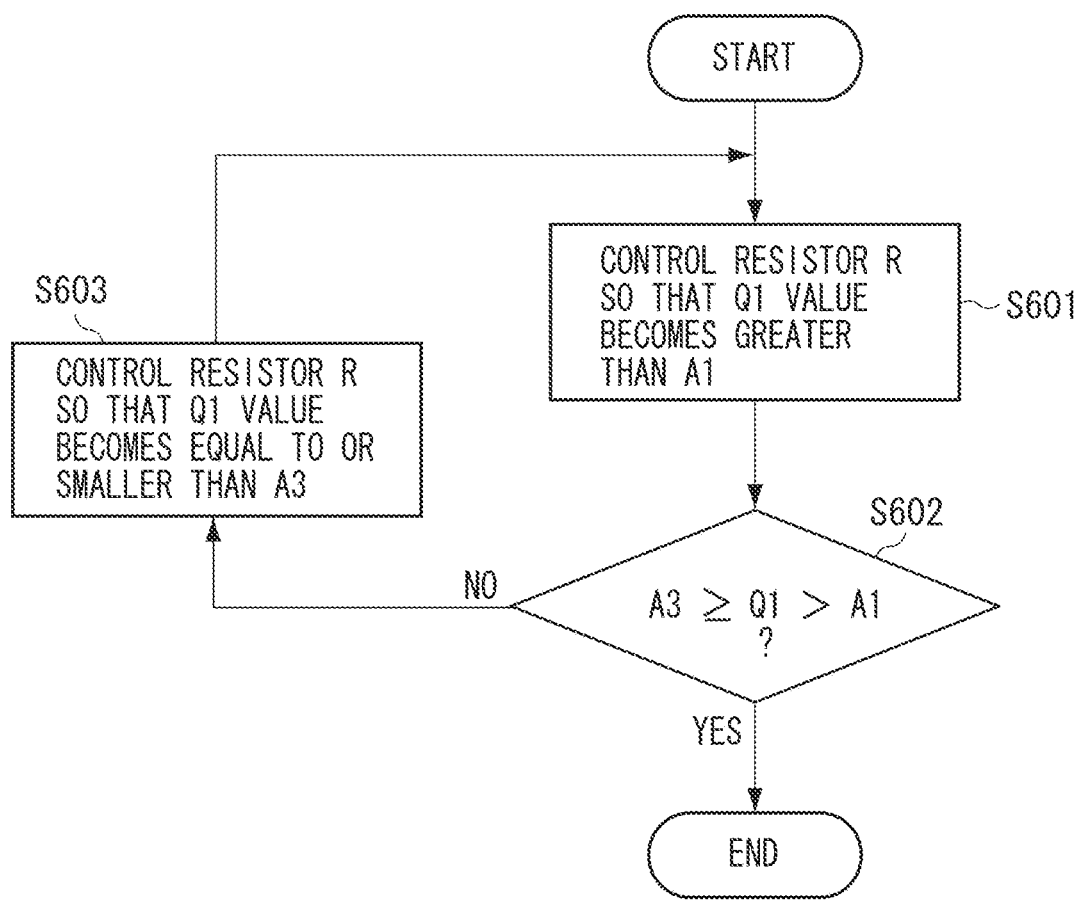
FIG. 6 is a flow chart illustrating an example of process for increasing the Q1 performed by the power supply apparatus in the first exemplary embodiment.

The process for increasing the Q1 value stored in the RAM 107 performed by the power supply apparatus 100 in the process of step S406 illustrated in FIG. 4 in the first exemplary embodiment is described below using the flow chart of FIG. 6.

The process for increasing the Q1 value stored in the RAM 107 may be realized by the CPU 105 executing the computer programs or instructions stored in the ROM 106.

In step S601, the CPU 105 controls the switch 304 so that the Q1 value stored in the RAM 107 becomes greater than the predetermined value A1. For example, if the switch 304 is connected to the resistor 308b, the CPU 105 controls the switch 304 so that the switch 304 is connected to the resistor 308a from the resistor 308b.

If the Q1 value stored in the RAM 107 is already greater than the predetermined value A1, the CPU 105 controls the switch 304 so that the switch 304 is not switched. If the switch 304 is controlled so that the Q1 value becomes greater than the predetermined value A1, the process proceeds from step S601 to step S602.

In step S602, the CPU 105 determines whether the Q1 value stored in the RAM 107 is equal to or smaller than the predetermined value A3 and greater than the predetermined value A1. The predetermined value A3 is a threshold corresponding to the maximum power which the power receiving apparatus 200 may receive from the power supply apparatus 100.

If the Q1 value stored in the RAM 107 is equal to or smaller than the predetermined value A3 and greater than the predetermined value A1, the power supply apparatus 100 may supply a large power to be charged to the power receiving apparatus 200 to the power receiving apparatus 200. However, in this case, the power supply apparatus 100 may not transmit a command to the power receiving apparatus 200 and supplies only power supplied to the power receiving apparatus 200 to the power receiving apparatus 200. If the Q1 value stored in the RAM 107 of the power supply apparatus 100 is smaller than the predetermined value A1, although the power supply apparatus 100 may transmit the command to the power receiving apparatus 200, the power supply apparatus 100 may not supply a large power to be charged to the power receiving apparatus 200 to the power receiving apparatus 200. For this reason, efficiency for charging the battery 210 is decreased in the power receiving apparatus 200.

If the Q1 value stored in the RAM 107 of the power supply apparatus 100 is greater than the predetermined value A3, the power which the power receiving apparatus 200 may receive is exceeded, so that the power which the power receiving apparatus 200 may not receive is wasted. The predetermined value A3 may be the one previously set by the CPU 105. If the CPU 105 determines that the Q1 value is equal to or smaller than the predetermined value A3 and greater than the predetermined value A1 (YES in step S602), the CPU 105 updates the Q1 value stored in the RAM 107 in step S604 and the process is ended. If the CPU 105 determines that the Q1 value is neither equal to nor smaller than the predetermined value A3 (NO in step S602), the process proceeds from step S602 to step S603. If the Q1 value is not greater than the predetermined value A1 (NO in step S602), the process also proceeds from step S602 to step S603.

In step S603, the CPU 105 controls the switch 304 so that the Q1 value becomes equal to or smaller than the predetermined value A3. If the switch 304 is controlled so that the Q1 value becomes equal to or smaller than the predetermined value A3, the process returns from step S603 to step S601. The CPU 105 may set the predetermined value A3 according to the information indicating the maximum Q1 value if the power receiving apparatus 200 receives only power from the power supply apparatus 100 without receiving the command.

Command transmission process performed by the power supply apparatus 100 in the first exemplary embodiment is described below using the flow chart of FIG. 7. The command transmission process may be realized by the CPU 105 executing the computer programs stored in the ROM 106.

Figure 4:
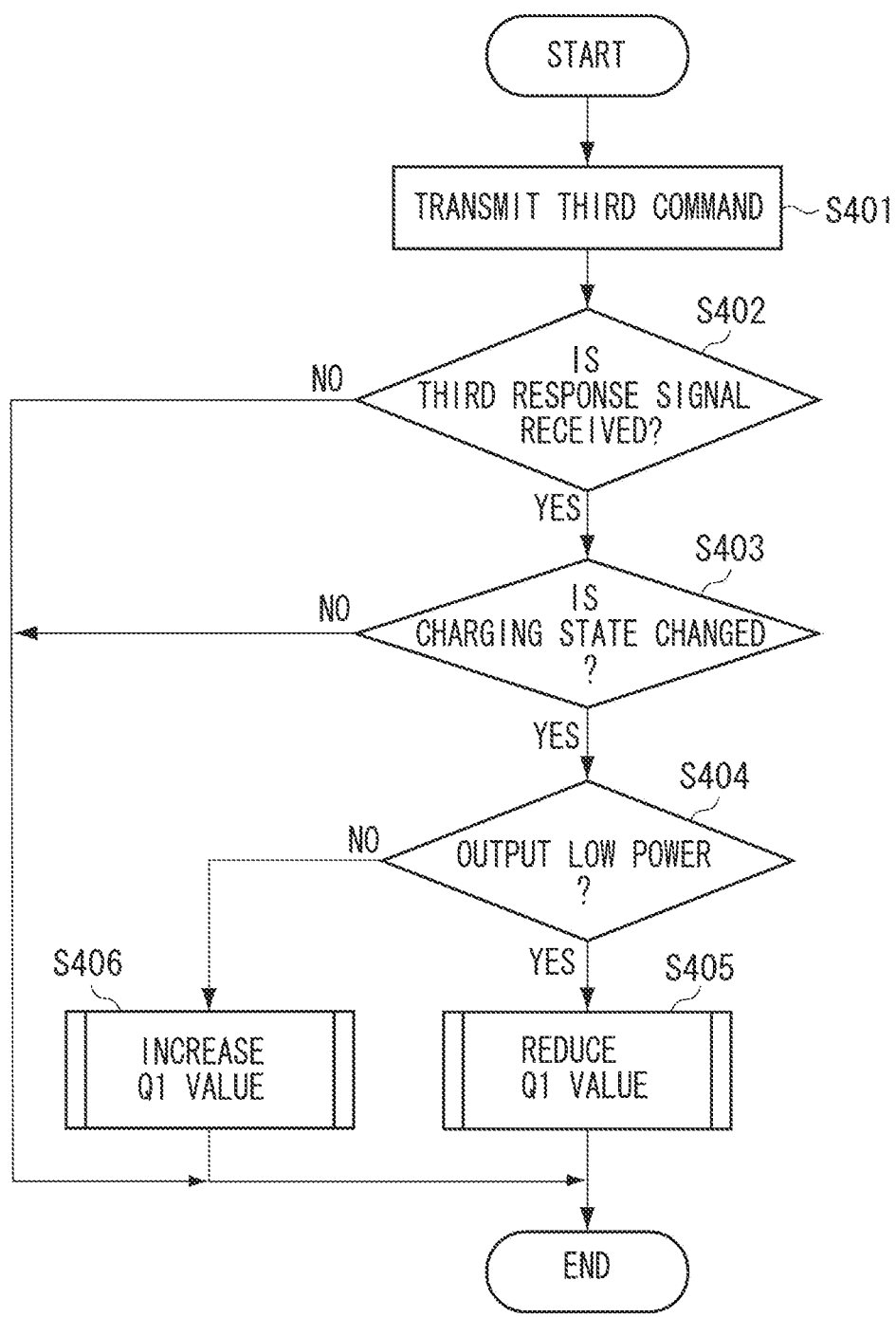
FIG. 4 is a flow chart illustrating an example of power supply control process performed by the power supply apparatus in the first to third exemplary embodiments.
Figure 7:
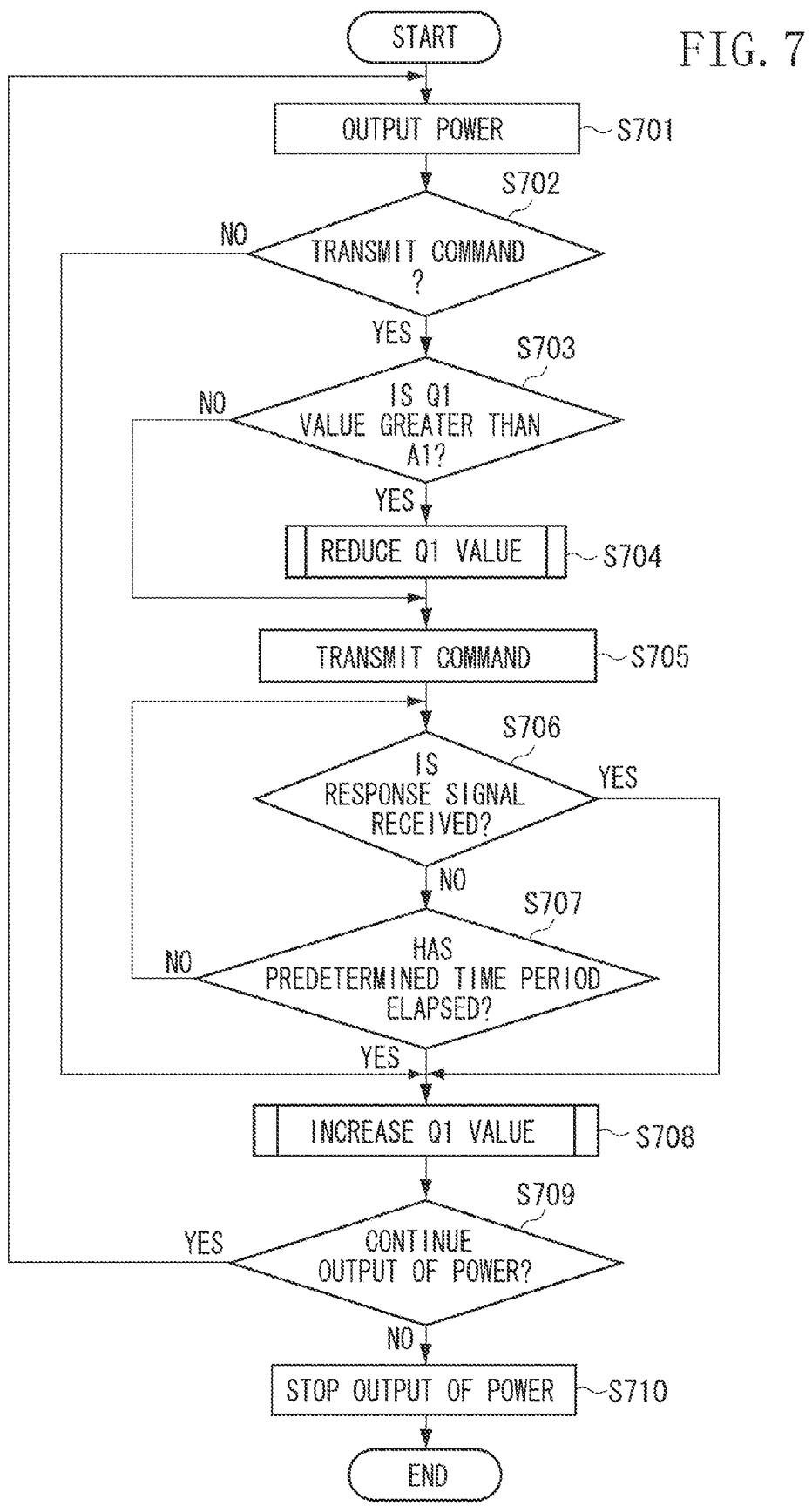
FIG. 7 is a flow chart illustrating an example of command transmission process performed by the power supply apparatus in the first and second exemplary embodiments.

The command transmission process illustrated in FIG. 7 is performed in the power supply apparatus 100 in which the process in FIG. 4 is performed. The command transmission process illustrated in FIG. 7 may be performed when the power supply apparatus 100 transmits the command to the power receiving apparatus 200 by the user operating the power supply apparatus 100 in performing the process in FIG. 4 in the power supply apparatus 100. If the command transmission process is performed by the CPU 105, the switch 301 is connected to one of the capacitor 305a and the capacitor 305b and the switch 302 is connected to one of the capacitor 306a and the capacitor 306b. Furthermore, if the command transmission process is performed by the CPU 105, the switch 303 in the matching circuit 103 is connected to one of the coil 307a and the coil 307b and the switch 304 is connected to one of the resistor 308a and the resistor 308b.

In step S701, the CPU 105 controls the oscillator 101, the power transmission circuit 102, and the matching circuit 103 so that power is supplied to the power receiving apparatus 200 in the same manner as in step S301. In this case, the process proceeds from operation S701 to step S702. If power is already supplied to the power receiving apparatus 200, the process in step S701 may be omitted.

In step S702, the CPU 105 determines whether the power supply apparatus 100 is in a state of transmitting a command. The state of transmitting a command is, for example, the state where the user operates the power supply apparatus 100 to input instructions for transmitting a specific command to the power receiving apparatus 200 to the CPU 105. If the CPU 105 determines that the power supply apparatus 100 is not in a state of transmitting the command (NO in step S702), the process proceeds from step S702 to step S708. If the CPU 105 determines that the power supply apparatus 100 is in a state of transmitting the command (YES in step S702), the process proceeds from step S702 to step S703.

In step S703, as is the same with step S303, the CPU 105 determines whether the Q1 value currently stored in the RAM 107 is greater than the predetermined value A1. If the CPU 105 determines that the Q1 value is greater than the predetermined value A1 (YES in step S703), the process proceeds from step S703 to step S704. If the CPU 105 determines that the Q1 value is equal to smaller than the predetermined value A1 (NO in step S703), the process proceeds from step S703 to step S705.

In step S704, as is the same with step S304, the CPU 105 performs the process for decreasing the Q1 value stored in the RAM 107 to transmit the command to the power receiving apparatus 200. If the CPU 105 performs the process for decreasing the Q1 value, the process proceeds from step S704 to step S705.

In step S705, the CPU 105 generates a command corresponding to user's operation of the power supply apparatus 100 and controls the modulation and demodulation circuit 104 to transmit the generated command to the power receiving apparatus 200. If the command is transmitted to the power receiving apparatus 200, the process proceeds from step S705 to step S706. The CPU 105 controls the timer 109 to measure the time elapsing after the command is transmitted to the power receiving apparatus 200. The time measured by the timer 109 is stored in the RAM 107. In step S705, the command transmitted to the power receiving apparatus 200 does not include the first, second, and third commands.

In step S706, the CPU 105 determines whether the modulation and demodulation circuit 104 receives the response signal in response to the command transmitted to the power receiving apparatus 200 in step S705. If the CPU 105 determines that the modulation and demodulation circuit 104 receives the response signal in response to the command transmitted to the power receiving apparatus 200 (YES in step S706), the CPU 105 stores the information included in the response signal supplied from the modulation and demodulation circuit 104 in the RAM 107. In this case (YES in step S706), the process proceeds from step S706 to step S708. If the CPU 105 determines that the modulation and demodulation circuit 104 does not receive the response signal in response to the command transmitted to the power receiving apparatus 200 in step S705 (NO in step S706), the CPU 105 causes the process to proceed from step S706 to step S707.

In step S707, the CPU 105 determines whether the time measured by the timer 109 in step S705 reaches a predetermined time. If the CPU 105 determines that the time measured by the timer 109 reaches the predetermined time (YES in step S707), the process proceeds from step S707 to step S708. If the CPU 105 determines that the time measured by the timer 109 does not reach the predetermined time (NO in step S707), the process returns from step S707 to step S706.

In step S708, as is the case with step S406, the CPU 105 performs the process for increasing the Q1 value. In this case, the CPU 105 determines that communication is completed between the power supply apparatus 100 and the power receiving apparatus 200, and the power supply apparatus 100 supplies only a charging power to the power receiving apparatus 200 without transmitting the command to the power receiving apparatus 200. If the CPU 105 performs the process for increasing the Q1 value, the process proceeds from step S708 to step S709.

In step S709, the CPU 105 determines whether the process for supplying power to the power receiving apparatus 200 is continued. If the CPU 105 determines that the power receiving apparatus 200 is not within a range in which power may be received from the power supply apparatus 100, the CPU 105 determines that the process for supplying power to the power receiving apparatus 200 is not continued, in other words, the process for supplying power to the power receiving apparatus 200 is stopped. If the CPU 105 determines that the power receiving apparatus 200 completes charging, the CPU 105 determines that the process for supplying power to the power receiving apparatus 200 is not continued, in other words, the process for supplying power to the power receiving apparatus 200 is stopped. The CPU 105 may also make a determination as to whether the power receiving apparatus 200 completes charging based on whether the command indicating that the charge of the battery 210 is completed is received from the power receiving apparatus 200. Furthermore, the CPU 105 may make a determination as to whether the power receiving apparatus 200 completes charging based on the information indicating the charging state of the power receiving apparatus 200 acquired by the power supply apparatus 100 from the power receiving apparatus 200.

If the CPU 105 determines that the power receiving apparatus 200 is within a range in which the power receiving apparatus 200 may receive power from the power supply apparatus 100 and the power receiving apparatus 200 is still charging, the CPU 105 determines that the process for supplying power to the power receiving apparatus 200 is continued.

If the CPU 105 determines that the process for supplying power to the power receiving apparatus 200 is not continued (NO in step S709), the process proceeds from step S709 to step S710.

If the CPU 105 determines that the process for supplying power to the power receiving apparatus 200 is continued (YES in step S709), the process proceeds from step S709 to step S701. If power is supplied to a plurality of power receiving apparatuses and the CPU 105 determines that all the power receiving apparatus are not within a range in which all the power receiving apparatus may receive power from the power supply apparatus 100, the CPU 105 determines that the process for supplying power to a plurality of power receiving apparatuses 200 is not continued. In this case, the process proceeds from step S709 to step S710. Furthermore, if power is supplied to a plurality of power receiving apparatuses and the CPU 105 determines that at least one power receiving apparatus is within a range in which power may be received from the power supply apparatus 100, the CPU 105 determines that the process for supplying power to a plurality of power receiving apparatuses 200 is continued. In this case, the process proceeds from step S709 to step S701.

In step S710, the CPU 105 controls the oscillator 101, the power transmission circuit 102, and the matching circuit 103 not to supply power to the power receiving apparatus 200. In this case, the process is ended.

Regarding the state for transmitting the command, the user does not need performing any operation of the power supply apparatus 100 if the CPU 105 is controlling the modulation and demodulation circuit 104 so that a specific command is transmitted to the power receiving apparatus 200.

Command reception process performed by the power receiving apparatus 200 in the first exemplary embodiment is described below using a flow chart in FIG. 8. The command reception process may be realized by the CPU 205 executing the computer programs or instructions stored in the ROM 206. The command reception process is performed if the power receiving apparatus 200 is within a range in which the power receiving apparatus 200 may receive power from the power supply apparatus 100.

If the battery 210 is attached to the power receiving apparatus 200, the CPU 205 determines whether the power receiving apparatus 200 may charge the battery 210 by power from the power supply apparatus 100. In step S801, the CPU 205 determines whether the rectifying and smoothing circuit 203 receives power supplied from the power supply apparatus 100 via the power receiving antenna 201. If the CPU 205 determines that the rectifying and smoothing circuit 203 does not receive power supplied from the power supply apparatus 100 via the power receiving antenna 201 (NO in step S801), the process proceeds from step S801 to step S814. If the CPU 205 determines that the rectifying and smoothing circuit 203 receives power supplied from the power supply apparatus 100 via the power receiving antenna 201 (YES in step S801), the process proceeds from step S801 to step S802.

In step S802, the CPU 205 determines whether the battery 210 is fully charged by using the information indicating the remaining capacity of the battery 210 supplied from the charging control unit 209. If the CPU 205 determines that the battery 210 is fully charged (YES in step S802), the process proceeds from step S802 to step S813. If the CPU 205 determines that the battery 210 is not fully charged (NO in step S802), the process proceeds from step S802 to step S803.

In step S803, the CPU 205 controls the rectifying and smoothing circuit 203 to supply the power received by the rectifying and smoothing circuit 203 to the charging control unit 209 via the regulator 208 and controls the charging control unit 209 to start charging the battery 210. If the battery 210 starts being charged, the process proceeds from step S803 to step S804.

In step S804, the CPU 205 determines whether the modulation and demodulation circuit 204 receives the command transmitted from the power supply apparatus 100. If the CPU 205 determines that the modulation and demodulation circuit 204 does not receive the command transmitted from the power supply apparatus 100 (NO in step S804), the process returns from step S804 to step S801. If the CPU 205 determines that the modulation and demodulation circuit 204 receives the command transmitted from the power supply apparatus 100 (YES in step S804), the process proceeds from step S804 to step S805.

In step S805, the CPU 205 controls the modulation and demodulation circuit 204 to analyze the command received by the modulation and demodulation circuit 204. In this case, the process proceeds from step S805 to step S806. When the analysis of the command is completed, the modulation and demodulation circuit 204 supplies the analysis results to the CPU 205.

In step S806, the CPU 205 determines whether the command received by the modulation and demodulation circuit 204 is the first command based on the analysis results supplied from the modulation and demodulation circuit 204. If the CPU 205 determines that the command received by the modulation and demodulation circuit 204 is not the first command (NO in step S806), the process proceeds from step S806 to step S808. If the CPU 205 determines that the command received by the modulation and demodulation circuit 204 is the first command (YES in step S806), the process proceeds from step S806 to step S807.

In step S807, the CPU 205 controls the modulation and demodulation circuit 204 to transmit the first response signal to the power supply apparatus 100. The CPU 205 controls the modulation and demodulation circuit 204 to perform the load modulation in which the identification information such as the identification ID, apparatus name, manufacturer's name of the power receiving apparatus 200 stored in the ROM 206 is read and transmitted to the power supply apparatus 100 with the identification information including such information as the first response signal. If the first response signal is transmitted to the power supply apparatus 100, the process returns from step S807 to step S801.

In step S808, the CPU 205 determines whether the command received by the modulation and demodulation circuit 204 is the second command based on the analysis results supplied from the modulation and demodulation circuit 204. If the CPU 205 determines that the command received by the modulation and demodulation circuit 204 is not the second command (NO in step S808), the process proceeds from step S808 to step S810. If the CPU 205 determines that the command received by the modulation and demodulation circuit 204 is the second command (YES in step S808), the process proceeds from step S808 to step S809.

In step S809, the CPU 205 controls the modulation and demodulation circuit 204 to transmit the second response signal to the power supply apparatus 100. The CPU 205 controls the modulation and demodulation circuit 204 to perform the load modulation in which the capacity information of the power receiving apparatus 200 stored in the ROM 206 is read and transmitted to the power supply apparatus 100 with the capacity information as the second response signal. If the second response signal is transmitted to the power supply apparatus 100, the process returns from step S809 to S801.

In step S810, the CPU 205 determines whether the command received by the modulation and demodulation circuit 204 is the third command based on the analysis results supplied from the modulation and demodulation circuit 204. If the CPU 205 determines that the command received by the modulation and demodulation circuit 204 is not the third command (NO in step S810), the process proceeds from step S810 to step S812. If the CPU 205 determines that the command received by the modulation and demodulation circuit 204 is the third command (YES in step S810), the process proceeds from step S810 to step S811.

In step S811, the CPU 205 controls the modulation and demodulation circuit 204 to transmit the third response signal to the power supply apparatus 100. The CPU 205 requests the charging control unit 209 to supply the information indicating the charging state of the power receiving apparatus 200 including the information indicating the remaining capacity of the battery 210, the charging current of the battery 210, and the charging voltage of the battery 210. If the charging control unit 209 supplies the information indicating the charging state of the power receiving apparatus 200 to the CPU 205, the CPU 205 controls the modulation and demodulation circuit 204 to perform the load modulation in which the information indicating the charging state of the power receiving apparatus 200 is transmitted to the power supply apparatus 100 as the third response signal. If the third response signal is transmitted to the power supply apparatus 100, the process returns from step S811 to step S801. If the information indicating the charging state of the power receiving apparatus 200 is stored in the RAM 207, the CPU 205 transmits the information indicating the charging state of the power receiving apparatus 200 read from the RAM 207 to the power supply apparatus 100 as the third response signal. If the CPU 205 does not cause the charging control unit 209 to charge the battery 210, the CPU 205 may cause the modulation and demodulation circuit 204 not to transmit the third response signal. If the battery 210 is not attached to the power receiving apparatus 200, the CPU 205 may cause the modulation and demodulation circuit 204 not to transmit the third response signal.

In step S812, the CPU 205 performs process according to the analysis results supplied from the modulation and demodulation circuit 204. The CPU 205 determines the command received by the modulation and demodulation circuit 204 based on the analysis results supplied from the modulation and demodulation circuit 204 and controls the modulation and demodulation circuit 204 to transmit a response signal in response to the command received by the modulation and demodulation circuit 204 to the power supply apparatus 100. In this case, the process returns from step S812 to step S801.

In step S813, the CPU 205 controls the rectifying and smoothing circuit 203 not to supply the power received by the rectifying and smoothing circuit 203 to the charging control unit 209 via the regulator 208 and controls the charging control unit 209 to stop charging the battery 210. In this case, the process proceeds from step S813 to step S804.

In step S814, as is the case with step S813, the CPU 205 controls the rectifying and smoothing circuit 203 not to supply the power received by the rectifying and smoothing circuit 203 to the charging control unit 209 via the regulator 208 and controls the charging control unit 209 to stop charging the battery 210. In this case, the process is ended.

Thus, if the power supply apparatus 100 transmits the command to the power receiving apparatus 200 in the present exemplary embodiment, but even if the power supply apparatus 100 does not transmit the command to another apparatus, but supplies power thereto, the Q1 value of the power supply apparatus 100 is controlled so that the Q1 value becomes the value for transmitting the command to the power receiving apparatus 200. This allows decreasing the power supplied to other devices and communicating with the power receiving apparatus 200 using the command.

The power supply apparatus 100 controls the Q1 value of the power supply apparatus 100 according to the charging state of the power receiving apparatus 200 to control the power supplied to the power receiving apparatus 200. The state of the power supply apparatus 100 may be controlled as to whether the power supply apparatus 100 supplies power to the power receiving apparatus 200 while communicating with the power receiving apparatus 200 using the command or the power supply apparatus 100 supplies power to the power receiving apparatus 200 not to decrease the efficiency of charging of the power receiving apparatus 200 while the power supply apparatus 100 may not transmit the command to the power receiving apparatus 200.

If the power supply apparatus 100 transmits the command to the power receiving apparatus 200 and receives a response signal from the power receiving apparatus 200, the Q1 value of the power supply apparatus 100 is controlled so that the Q1 value becomes equal to the value for supplying such power not to lower the efficiency of charging of the power receiving apparatus 200. This does not allow communicating with the power receiving apparatus 200 using the command, however, such power not to lower the efficiency of charging of the power receiving apparatus 200 may be supplied.

The power supply apparatus 100 according to the first exemplary embodiment communicates with the power receiving apparatus 200 using the load modulation communication system, but not limited to this. The power supply apparatus 100 may be a system communicating with the power receiving apparatus 200 using a communication system of wireless Local Area Network (LAN) communication standards such as Institute of Electrical and Electronics Engineers (IEEE) 802 11a, 11b, and 11, for example.

The matching circuit 103 of the power supply apparatus 100 uses the circuit illustrated in FIG. 2, but not limited to this. The matching circuit 103 of the power supply apparatus 100 may use a circuit illustrated in FIG. 9, for example.

Figure 9:
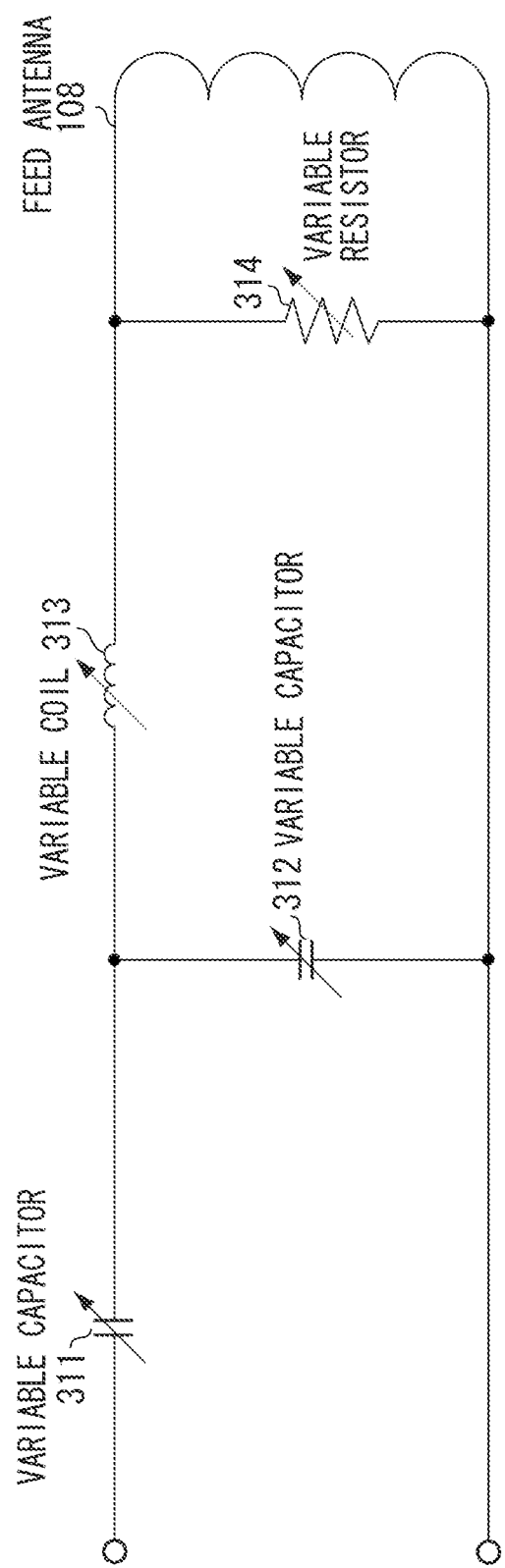
FIG. 9 illustrates an example of a configuration of a matching circuit of the power supply apparatus in the first to third exemplary embodiments.

The matching circuit 103 illustrated in FIG. 9 includes a variable capacitor 311 instead of the switch 301 and the capacitors 305a and 305b and a variable capacitor 312 instead of the switch 302 and the capacitors 306a and 306b. The matching circuit 103 illustrated in FIG. 9 includes a variable coil 313 instead of the switch 303 and the coils 307a and 307b and a variable resistor 314 instead of the switch 304 and the resistors 308a and 308b.

The variable capacitors 311 and 312 are those for matching impedance. The variable capacitor 312 is the one which adjusts the resonance frequency f. The CPU 105 controls the variable capacitors 311 and 312 by a motor or a variable capacitance diode to change the capacitance C1 of the matching circuit 103. The variable coil 313 is the one for adjusting the resonance frequency f. The CPU 105 controls the variable coil 313 by a motor to change the inductance L1 of the matching circuit 103. The variable resistor 314 is a damping resistor used for adjusting the Q1 value. The CPU 105 controls the variable resistor 314 by a digital potentiometer to change the impedance R1 of the resistor. Although the variable resistor 314 is connected in parallel to the feed antenna 108, the variable resistor 314 may be connected in series thereto.

Figure 5:
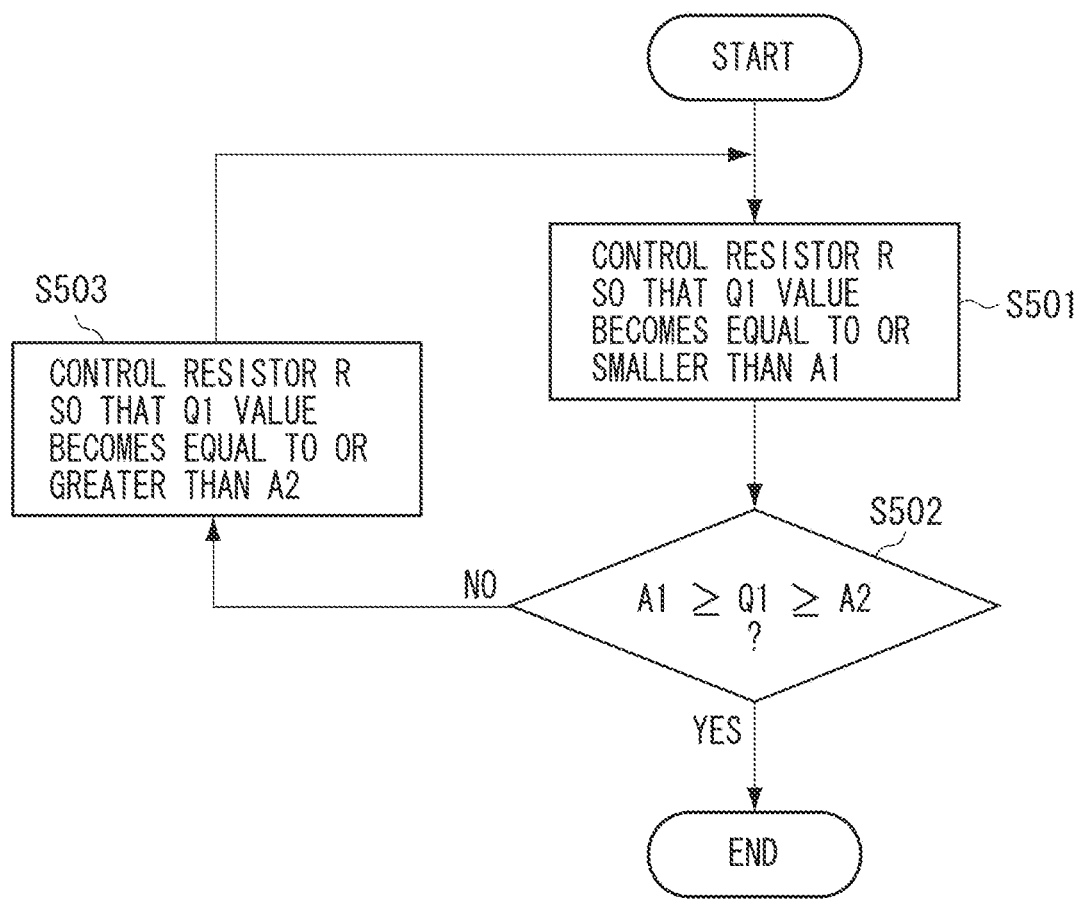
FIG. 5 is a flow chart illustrating an example of process for reducing a Q1 performed by the power supply apparatus in the first exemplary embodiment.

The process in steps S304, S405, and S704 in the first exemplary embodiment is similar to the process for reducing the Q1 value illustrated in FIG. 5. The process in steps S406 and S708 in the first exemplary embodiment is similar to the process for increasing the Q1 value illustrated in FIG. 6.

The matching circuit 103 of the power supply apparatus 100 illustrated in FIG. 9 is described below. When the CPU 105 performs the process for reducing the Q1 value in steps S304, S405, and S704, the CPU 105 controls the value of the variable resistor 314 so that the Q1 value is equal to or smaller than the predetermined value A1 and equal to or greater than the predetermined value A2. Furthermore, when the CPU 105 performs the process for increasing the Q1 value in steps S406 and S708, the CPU 105 controls the value of the variable resistor 314 so that the Q1 value is equal to or smaller than the predetermined value A3 and equal to or greater than the predetermined value A1.

In the first exemplary embodiment, an example is described in which the matching circuit 103 is controlled to increase the impedance R1 of the matching circuit 103 if the Q1 value is increased. Also, in the first exemplary embodiment, an example is described in which the matching circuit 103 is controlled to decrease the impedance R1 of the matching circuit 103 if the Q1 value is reduced. In the second exemplary embodiment, on the other hand, an example is described in which the matching circuit 103 is controlled to change the capacitance C1 and the inductance L1 of the matching circuit 103 if the Q1 value is changed.

The power supply apparatus 100 and the power receiving apparatus 200 in the second exemplary embodiment are similar to those in the first exemplary embodiment, so that the description thereof is omitted herein. Regarding the power supply process illustrated in FIG. 3, the power supply control process illustrated in FIG. 4, and the command transmission process illustrated in FIG. 7 which are performed by the power supply apparatus 100, the process similar to that in the first exemplary embodiment is omitted from description but the process different from that in the first exemplary embodiment is described. The command transmission process performed by the power receiving apparatus 200 illustrated in FIG. 8 is also similar to that in the first exemplary embodiment, the description thereof is omitted.

The process for reducing the Q1 value stored in the RAM 107 performed by the CPU 105 in the power supply process in step S304 of the second exemplary embodiment is described below using a flow chart in FIG. 10. The process for reducing the Q1 value illustrated in FIG. 10 may be realized by the CPU 105 executing the computer programs or instructions stored in the ROM 106.

In step S1001, the CPU 105 controls the switches 301 and 302 so that the Q1 value becomes equal to or smaller than the predetermined value A1. If the Q1 value is equal to or smaller than the predetermined value A1, the CPU 105 does not switch the connection of the switches 301 and 302. If the switches 301 and 302 are controlled so that the Q1 value becomes equal to or smaller than the predetermined value A1, the process proceeds from step S1001 to step S1002. If the switches 301 and 302 are controlled so that the Q1 value becomes equal to or smaller than the predetermined value A1 by the process in step S1001, the capacitance C1 of the matching circuit 103 becomes greater than that before the process in step S1001. This may change the resonance frequency f. For this reason, in step S1002, the CPU 105 adjusts the inductance L1 by controlling the switch 303 in order to maintain the resonance frequency f at the resonance frequency f stored in the RAM 107 before the process in step S1001 is performed. If the switch 303 is controlled so that the resonance frequency f is kept constant, the process proceeds from step S1001 to step S1002.

In step S1003, the CPU 105 determines whether the Q1 value stored in the RAM 107 is equal to or smaller than the predetermined value A1 and equal to or greater than the predetermined value A2. If the CPU 105 determines that the Q1 value is equal to or smaller than the predetermined value A1 and equal to or greater than the predetermined value A2 (YES in step S1003), the CPU 105 updates the Q1 value stored in the RAM 107 in step S1005 and the process is ended.

If the CPU 105 determines that the Q1 value is neither equal to nor smaller than the predetermined value A1 (NO in step S1003), the process proceeds from step S1003 to step S1004. If the CPU 105 determines that the Q1 value is neither equal to nor greater than the predetermined value A2 (NO in step S1003), the process also proceeds from step S1003 to step S1004.

In step S1004, the CPU 105 controls the switches 301 and 302 so that the Q1 value becomes equal to or greater than the predetermined value A2. If the switches 301 and 302 are controlled so that the Q1 value becomes equal to or greater than the predetermined value A2, the process returns from step S1004 to step S1001.

Figure 10:
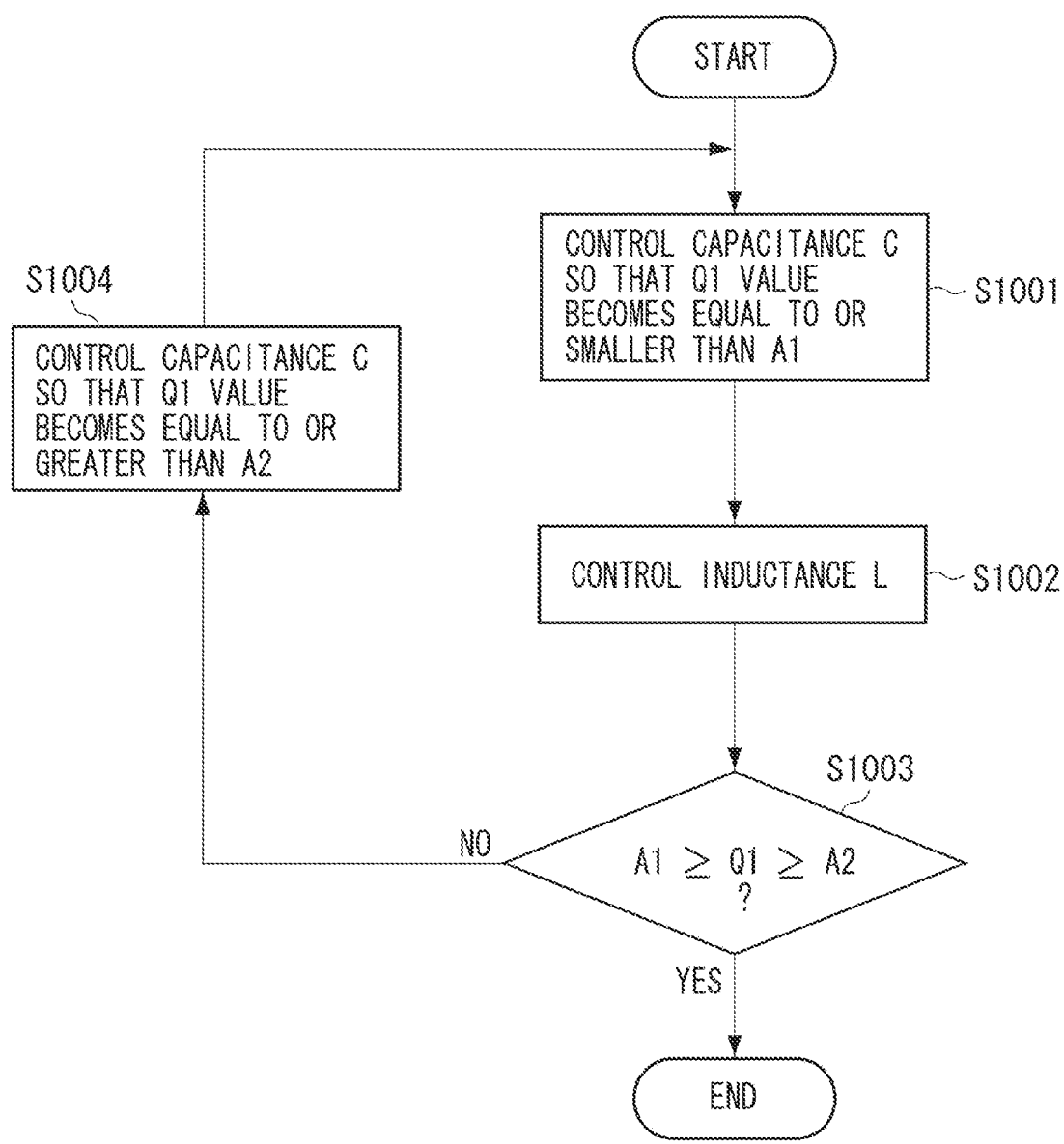
FIG. 10 is a flow chart illustrating an example of process for reducing a Q1 performed by the power supply apparatus in the second exemplary embodiment.

The process for reducing the Q1 value performed in steps S405 and S704 is also similar to the process for reducing the Q1 value illustrated in FIG. 10.

Figure 11:
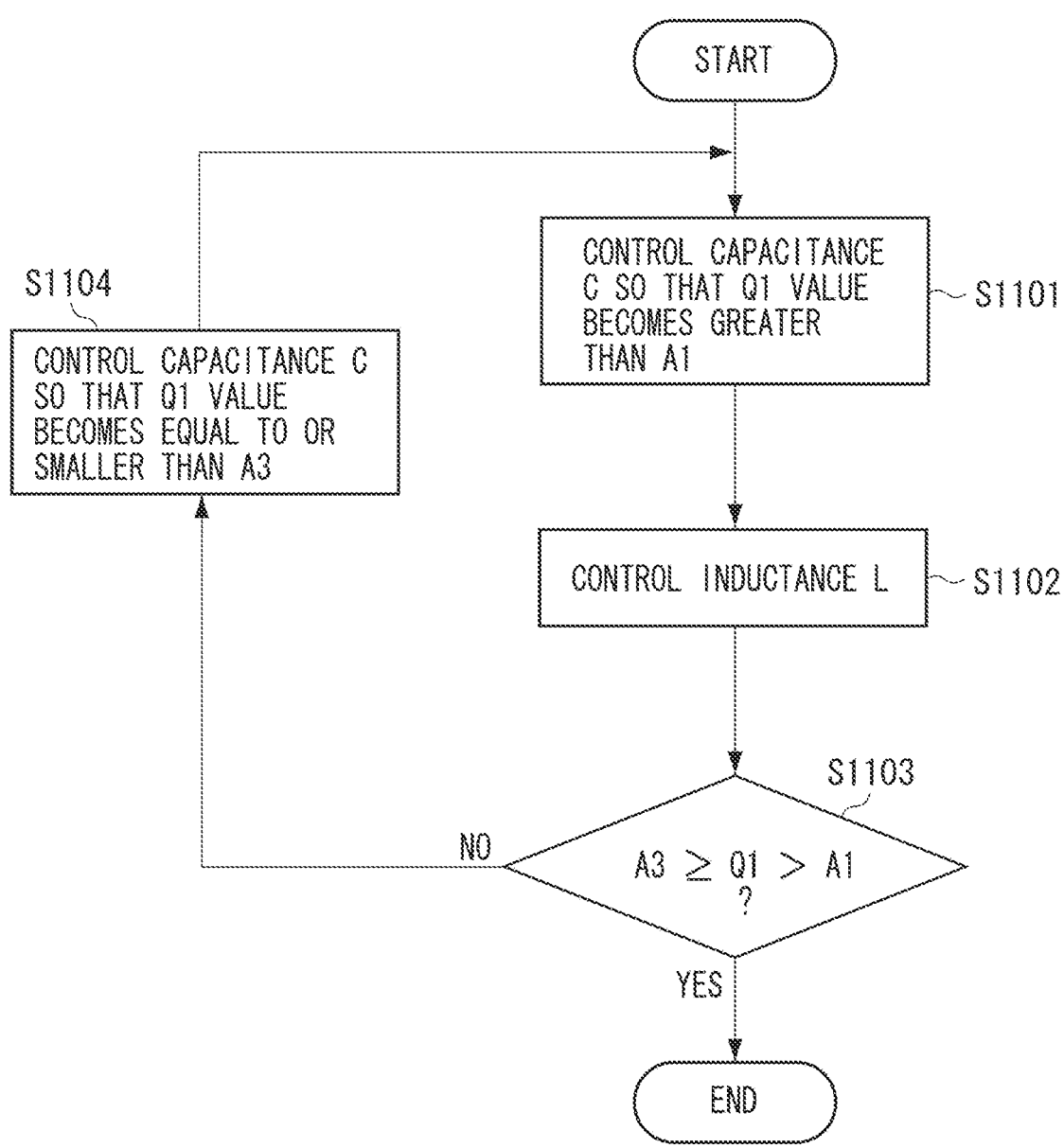
FIG. 11 is a flow chart illustrating an example of process for increasing the Q1 performed by the power supply apparatus in the second exemplary embodiment.

The process for increasing the Q1 value performed by the CPU 105 in the power supply control process in step S406 in the second exemplary embodiment is described using a flow chart of FIG. 11. The process for increasing the Q1 value illustrated in FIG. 11 may be realized by the CPU 105 executing the computer program or instructions stored in the ROM 106.

In step S1101, the CPU 105 controls the switches 301 and 302 so that the Q1 value becomes greater than the predetermined value A1. If the Q1 value is already greater than the predetermined value A1, the CPU 105 does not switch the connection of the switches 301 and 302. If the switches 301 and 302 are controlled so that the Q1 value becomes greater than the predetermined value A1, the process proceeds from step S1101 to step S1102.

If the switches 301 and 302 are controlled so that the Q1 value becomes greater than the predetermined value A1 by the process in step S1101, the capacitance C1 of the matching circuit 103 becomes smaller than that before the process in step S1101. This may change the resonance frequency f stored in the RAM 107.

For this reason, in step S1102, the CPU 105 adjusts the inductance L1 of the matching circuit 103 by controlling the switch 303 in order to maintain the resonance frequency f at the resonance frequency f stored before the process in step S1101 is performed. If the switch 303 is controlled so that the resonance frequency f stored in the RAM 107 is kept constant, the process proceeds from step S1102 to step S1103.

In step S1103, the CPU 105 determines whether the Q1 value is equal to or smaller than the predetermined value A1 and greater than the predetermined value A1. If the CPU 105 determines that the Q1 value is equal to or smaller than the predetermined value A1 and greater than the predetermined value A1 (YES in step S1103), the CPU 105 updates the Q1 value stored in the RAM 107 in step S1105 and the process is ended.

If the CPU 105 determines that the Q1 value is neither equal to nor smaller than the predetermined value A3 (NO in step S1103), the process proceeds from step S1103 to step S1104. If the CPU 105 determines that the Q1 value is equal to or smaller than the predetermined value A1 (NO in step S1103), the process also proceeds from step S1103 to step S1104.

In step S1104, the CPU 105 controls the switches 301 and 302 so that the Q1 value becomes equal to or smaller than the predetermined value A2. If the switches 301 and 302 are controlled so that the Q1 value becomes equal to or smaller than the predetermined value A1, the process returns from step S1104 to step S1101.

The process for reducing the Q1 value performed in step S408 is also similar to the process for increasing the Q1 value illustrated in FIG. 11.

In steps S1002 and S1102, the CPU 105 adjusts the inductance L1 of the matching circuit 103 by controlling the switch 303 in order to keep the resonance frequency f stored in the RAM 107 constant. In this case, the value of the inductance L1 of the matching circuit 103 for keeping the resonance frequency f constant with respect to the value of the capacitance C1 of the matching circuit 103 is previously stored in the ROM 106. Thereby, the CPU 105 keeps the resonance frequency f constant according to the value of the capacitance C1 of the matching circuit 103 and the value of the inductance L1 of the matching circuit 103 for keeping the resonance frequency f constant stored in the ROM 106.

The matching circuit 103 illustrated in FIG. 9 in the second exemplary embodiment is described below.

When the CPU 105 performs the process for reducing the Q1 value in steps S304, S405, and S704, the CPU 105 controls the value of the variable capacitor 312 so that the Q1 value is equal to or smaller than the predetermined value A1 and equal to or greater than the predetermined value A2. In this case, the CPU 105 controls also the value of the variable coil 313 to keep the resonance frequency f constant.

When the CPU 105 performs the process for increasing the Q1 value in steps S406 and S708, the CPU 105 controls the value of the variable capacitor 312 so that the Q1 value is equal to or smaller than the predetermined value A3 and greater than the predetermined value A1. In this case, the CPU 105 controls also the value of the variable coil 313 to keep the resonance frequency f constant.

In the second exemplary embodiment, the value of the capacitance C1 of the matching circuit 103 is changed to change the Q1 value and then the value of the inductance L1 of the matching circuit 103 is adjusted to keep the constant resonance frequency f, but not limited to this. For example, the value of the inductance L1 of the matching circuit 103 is changed to change the Q1 value and then the value of the capacitance C1 of the matching circuit 103 may be adjusted to keep the constant resonance frequency f. In this case, the value of the capacitance C1 of the matching circuit 103 for keeping the resonance frequency f constant with respect to the value of the inductance L1 of the matching circuit 103 is previously stored in the ROM 106.

The power supply apparatus 100 in the second exemplary embodiment performs the process except the process for reducing the Q1 value in FIG. 10 and the process for increasing the Q1 value in FIG. 11 in a similar manner as that in the first exemplary embodiment, so that the second exemplary embodiment may achieve the effect similar to that in the first exemplary embodiment. The CPU 105 may control the Q1 value with the process for reducing the Q1 value in the first exemplary embodiment combined with the process for reducing the Q1 value in the second exemplary embodiment. Similarly, the CPU 105 may control the Q1 value with the process for increasing the Q1 value in the first exemplary embodiment combined with the process for increasing the Q1 value in the second exemplary embodiment.

In the first exemplary embodiment, the example is described in which the Q1 value of the power supply apparatus 100 is controlled to control the power that the power supply apparatus 100 supplies to the power receiving apparatus 200. In the third exemplary embodiment, on the other hand, an example is described below in which the Q2 value of the power receiving apparatus 200 is controlled to control the power that the power receiving apparatus 200 receives from the power supply apparatus 100.

The description of the portions common to those in the first exemplary embodiment in the configuration of the power supply apparatus 100 and the power receiving apparatus 200 is omitted in the third exemplary embodiment, but different portions are described. The power supply process illustrated in FIG. 3 and the power supply control process illustrated in FIG. 4 which are performed by the power supply apparatus 100 are also performed in a similar manner as those in the first exemplary embodiment. The description of common process is omitted, but that of different process is performed.

The process for increasing the Q1 value and the process for reducing the Q1 value performed in the third exemplary embodiment may be performed in a similar manner as the process for increasing the Q1 value and the process for reducing the Q1 value performed in the first exemplary embodiment. Furthermore, the process for increasing the Q1 value and the process for reducing the Q1 value performed in the third exemplary embodiment may be performed in a similar manner as the process for increasing the Q1 value and the process for reducing the Q1 value performed in the second exemplary embodiment.

The CPU 205 of the power receiving apparatus 200 in the third exemplary embodiment may control the matching circuit 202 to change a quality factor Q2 in order to perform control as to how much power supplied from the power supply apparatus 100 is received. As is the case with the Q1, the Q2 is a value indicating the characteristic of resonance in the power supply apparatus 100 and the sharpness of peak of the resonance frequency f and stored in the RAM 207. Hereinafter, a value of the quality factor Q2 is referred to as a "Q2 value". The resonance frequency f is expressed by the following equation (3), where L2 denotes the inductance of the matching circuit 202 and C2 is the capacitance of the matching circuit 202. The value of the resonance frequency f is stored in the RAM 207 with the Q2 value.

$$f = \frac{1}{2\pi\sqrt{L2C2}} \quad (3)$$

The Q2 value is used for the power receiving apparatus 200 in order to perform control as to how much power supplied from the power supply apparatus 100 is received. The Q2 value is defined by the following equation (4), where R2 denotes the impedance of resistor of the matching circuit 202, L2 is the inductance of the matching circuit 202, and C2 is the capacitance of the matching circuit 202.

$$Q2 = \frac{1}{R2}\sqrt{\frac{L2}{C2}} \quad (4)$$

If a value of the impedance R2 of the resistor is large, the Q2 value decreases. If a value of the impedance R2 of the resistor is small, the Q2 value increases. If a value of the capacitance C2 is large, the Q2 value decreases. If a value of the capacitance C2 is small, the Q2 value increases. If a value of the inductance L2 is a small, the Q2 value decreases. If a value of the inductance L2 is large, the Q2 value increases.

Figure 12:
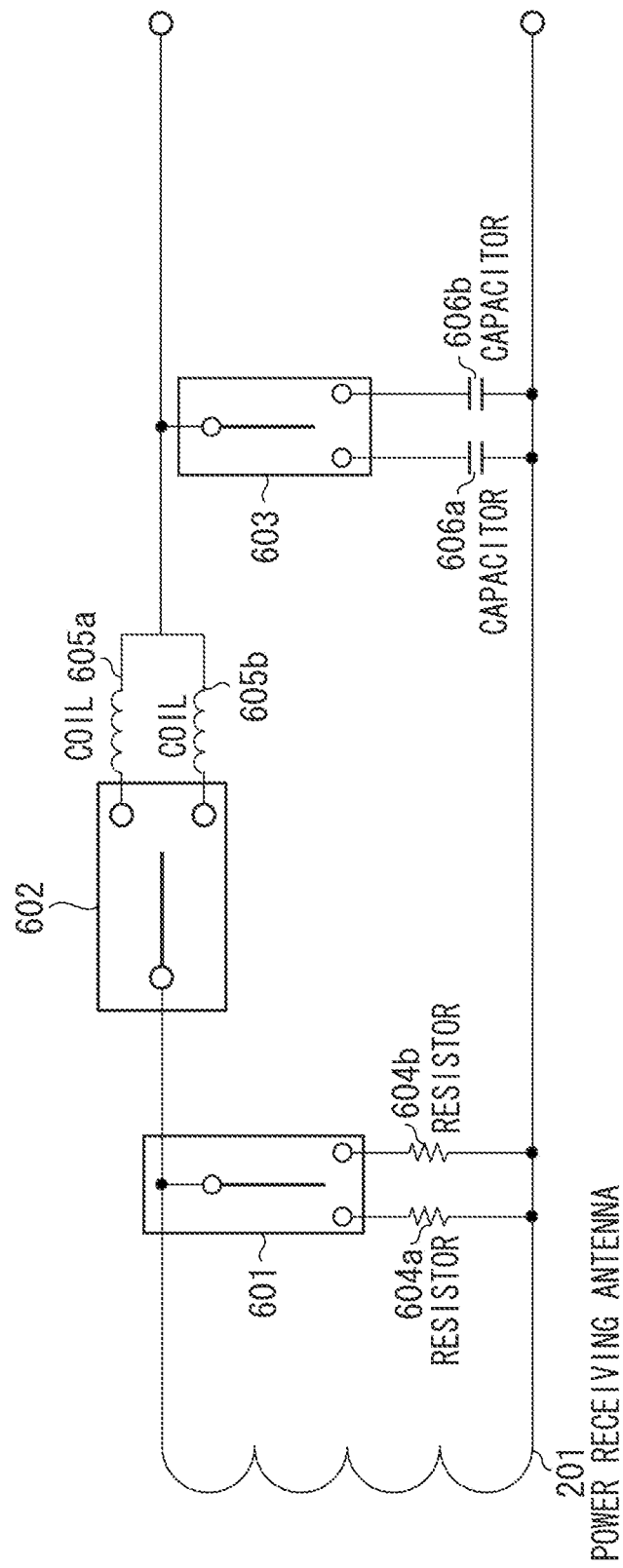
FIG. 12 illustrates an example of a configuration of a matching circuit of the power receiving apparatus in the third exemplary embodiment.

FIG. 12 illustrates a configuration of the matching circuit 202 of the power receiving apparatus 200 in the third exemplary embodiment.

The matching circuit 202 illustrated in FIG. 12 includes resistors 604a and 604b, coils 605a and 605b, and capacitors 606a and 606b. The matching circuit 202 illustrated in FIG. 12 further includes switches 601, 602, and 603 for matching the impedance between the power receiving antenna 201 and the rectifying and smoothing circuit 203.

A value of the resistor 604a is greater than a value of the resistor 604b.

The coils 605a and 605b adjust the resonance frequency f determined by equation (3). A value of the coil 605a is greater than a value of the coil 605b.

The capacitors 606a and 606b adjust the resonance frequency f determined by equation (3). A value of capacitor 606a is greater than a value of the coil 606b.

The switch 601 selectively switches between the resistors 604a and 604b. The switch 602 selectively switches between the coils 605a and 605b. The switch 603 selectively switches between the capacitors 606a and 606b.

The switches 601 to 603 are those that selectively switch terminals, but not limited to this. For example, the switches 601 to 603 may use relay switches or switches included in an IC. The switches 601 to 603 are controlled by the CPU 205. Although the matching circuit 202 includes the capacitors 606a and 606b, the matching circuit 202 may further include one or more additional capacitors as well as the capacitors 606a and 606b. Similarly, the matching circuit 202 may further include one or more additional coils as well as the coils 605a and 605b, and one or more additional resistors as well as the resistors 604a and 604b. The resistors 604a and 604b are connected in parallel to the power receiving antenna 201, however, they may be connected in series to the power receiving antenna 201.

Command transmission process performed by the power supply apparatus 100 in the third exemplary embodiment is described below using the flow chart in FIG. 13. The command transmission process may be realized by the CPU 105 executing the computer programs or instructions stored in the ROM 106.

Figure 13:
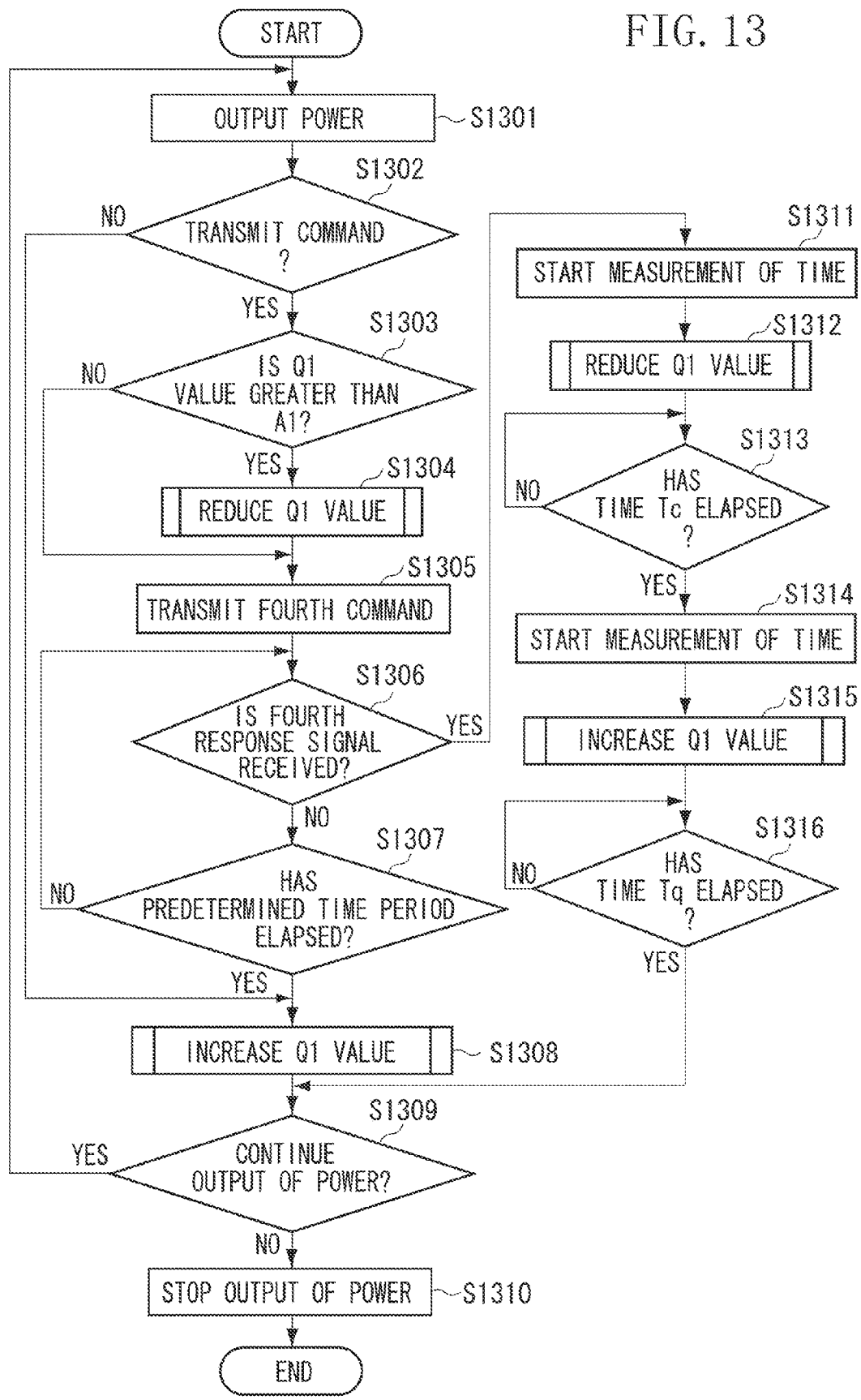
FIG. 13 is a flow chart illustrating an example of command transmission process performed by the power supply apparatus in the third exemplary embodiment.

The command transmission process illustrated in FIG. 13 is performed in the power supply apparatus 100 if the process in FIG. 3 is performed. The command transmission process illustrated in FIG. 13 may be performed when the power supply apparatus 100 transmits the command to the power receiving apparatus 200 by the user operating the power supply apparatus 100. If the command transmission process is performed by the CPU 105, the switch 301 is connected to one of the capacitor 305a and the capacitor 305b and the switch 302 is connected to one of the capacitor 306a and the capacitor 306b. Furthermore, if the command transmission process is performed by the CPU 105, the switch 303 in the matching circuit 103 is connected to one of the coil 307a and the coil 307b and the switch 304 is connected to one of the resistor 308a and the resistor 308b.

The command transmission process in steps S1301 to S1304 illustrated in FIG. 13 is similar to that in steps S701 to S704 illustrated in FIG. 7, so that the description thereof is omitted herein. Furthermore, the command transmission process in steps S1307 to S1310 illustrated in FIG. 13 is similar to that in steps S707 to S710 illustrated in FIG. 7, so that the description thereof is omitted herein.

In step S1305, the CPU 105 generates the command for controlling the Q2 value of the power receiving apparatus 200 and controls the modulation and demodulation circuit 104 to transmit the command generated for controlling the Q2 value of the power receiving apparatus 200 to the power receiving apparatus 200. Hereinafter, the command for controlling the Q2 value of the power receiving apparatus 200 is referred to as "fourth command."

The fourth command includes information for controlling the power receiving apparatus 200 to decrease the Q2 value until a predetermined time Tc has elapsed and information for controlling the power receiving apparatus 200 to increase the Q2 value until a predetermined time Tq has elapsed. The fourth command also includes information indicating the predetermined time Tc and information indicating the predetermined time Tq.

The predetermined time Tc may be different from the predetermined time Tq or equal thereto. The predetermined time Tc and the predetermined time Tq are previously stored in the ROM 106 or an appropriate memory device.

If the fourth command is transmitted to the power receiving apparatus 200, the process proceeds from step S1305 to step S1306. The CPU 105 controls the timer 109 to measure time elapsed after the fourth command is transmitted. The time measured by the timer 109 is stored in the RAM 107.

In step S1306, the CPU 105 determines whether the modulation and demodulation circuit 104 receives a response signal in response to the fourth command transmitted to the power receiving apparatus 200 in step S1305. If the CPU 105 determines that the modulation and demodulation circuit 104 receives the response signal in response to the fourth command transmitted to the power receiving apparatus 200 in step S1305 (YES in step S1306), the CPU 105 stores information included in the response signal supplied from the modulation and demodulation circuit 104 in the RAM 107. In this case (YES in step S1306), the process proceeds from step S1306 to step S1311. If the CPU 105 determines that the modulation and demodulation circuit 104 does not receive the response signal in response to the fourth command transmitted to the power receiving apparatus 200 in step S1305 (NO in step S1306), the CPU causes the process to proceed from step S1306 to step S1307. Hereinafter, the response signal in response to the fourth command is referred to as "fourth response signal."

In step S1311, the CPU 105 controls the timer 109 to measure time elapsed after the fourth response signal is received. If the timer 109 is controlled to measure time elapsed after the fourth command is transmitted in step S1305, the time stored in the RAM 107 and measured by the timer 109 is reset and then the process in operation S1311.

Time t measured by the timer 109 is stored in the RAM 107. In this case, the process proceeds from step S1311 to step S1312.

In step S1312, the CPU 105 performs the process for decrease the Q1 value. If the process for decreasing the Q1 value is performed in step S1312, the process proceeds from step S1312 to step S1313.

In step S1313, the CPU 105 determines whether the time t measured by the timer 109 in step S1311 reaches a predetermined time Tc. If the CPU 105 determines that the time t measured by the timer 109 reaches the predetermined time Tc (YES in step S1313), the process proceeds from step S1313 to step S1314. If the CPU 105 determines that the time t measured by the timer 109 does not reach the predetermined time Tc (NO in step S1313), the process returns from step S1313 to step S1313. In this case, the CPU 105 causes the power supply apparatus 100 to communicate with the power receiving apparatus 200 by transmitting the command to the power receiving apparatus 200 until the predetermined time Tc has elapsed after the fourth response signal is received. Therefore, although the efficiency of reception of the power receiving apparatus 200 is reduced until the predetermined time Tc has elapsed after the fourth response signal is received, the power supply apparatus 100 may control the power receiving apparatus 200 by transmitting a command to the power receiving apparatus 200.

In step S1314, the CPU 105 controls the timer 109 to measure the time s elapsed after it is determined that the time t measured by the timer 109 reaches the predetermined time Tc. In step S1311, if the timer is controlled to measure the time t elapsed after the fourth response signal is received from the power receiving apparatus 200 in step S1305, the measured time t stored in the RAM 107 is reset and the process in step S1314 is performed. The time s measured by the timer 109 is stored in the RAM 107. In this case, the process proceeds from step S1314 to step S1315.

In step S1315, the CPU 105 performs the process for increasing the Q1 value. If the process for increasing the Q1 value is performed in step S1315, the process proceeds from step S1315 to step S1316.

In step S1316, the CPU 105 determines whether the time measured by the timer 109 in step S1314 reaches a predetermined time Tq. If the CPU 105 determines that the time s measured by the timer 109 reaches the predetermined time Tq (YES in step S1316), the process proceeds from step S1316 to step S1309. If the CPU 105 determines that the time s measured by the timer 109 does not reach the predetermined time Tq (NO in step S1316), the process returns from step S1316 to step S1316. In this case, the CPU 105 causes the power supply apparatus 100 to increase the power supplied to the power receiving apparatus 200 without transmitting the command to the power receiving apparatus 200 while the predetermined time Tq elapses after the predetermined time Tc elapses, thereby increasing the efficiency of charging by the power receiving apparatus 200. For this reason, the CPU 105 may not transmit the command to the power receiving apparatus 200 while the predetermined time Tq elapses after the predetermined time Tc elapses, however, the CPU 105 may perform control so that the efficiency of charging by the power receiving apparatus 200 is increased.

Figure 14B:
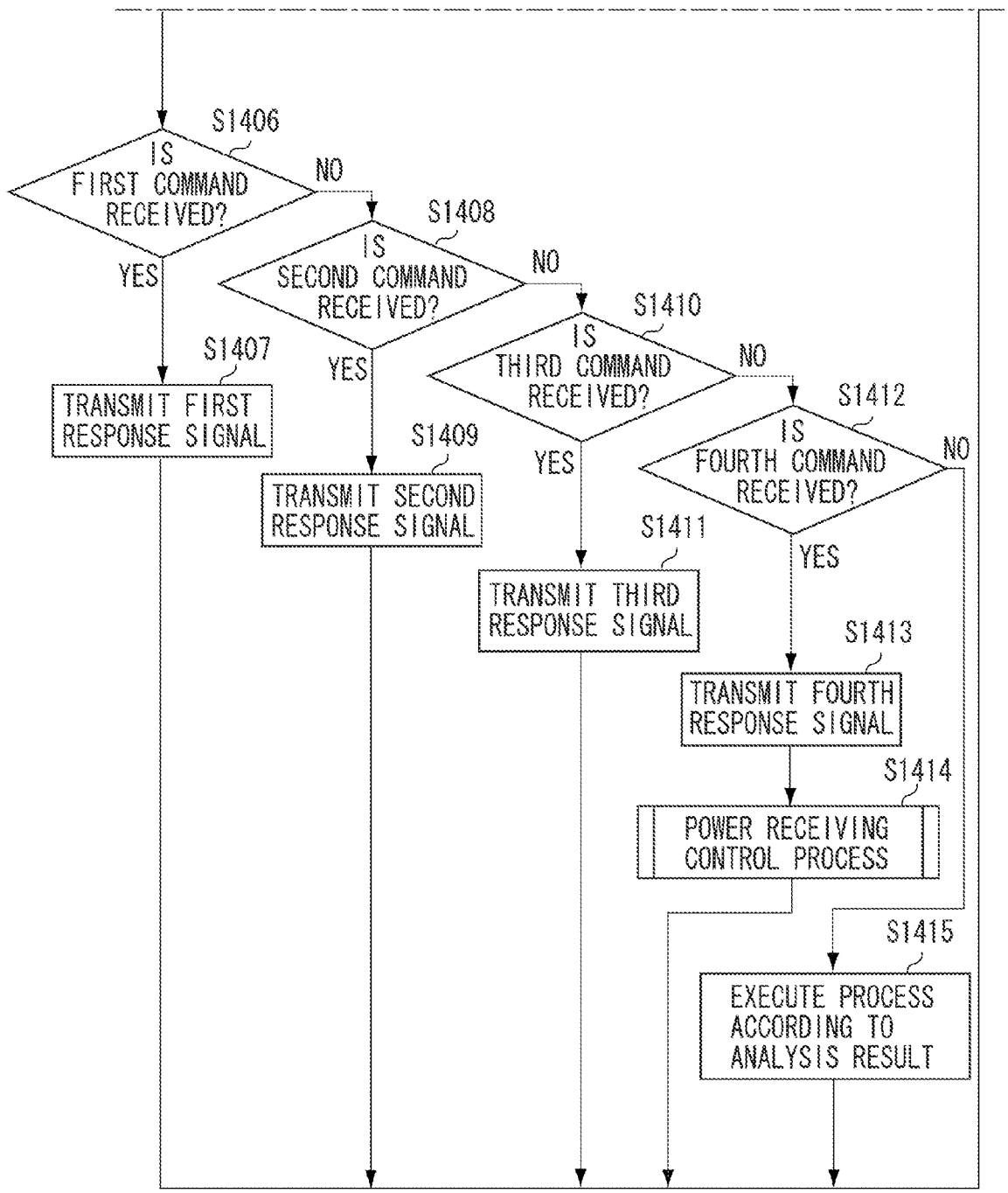
FIG. 14B is a flow chart illustrating a second part of an example of command transmission process performed by the power receiving apparatus in the third exemplary embodiment.

Command reception process performed by the power receiving apparatus 200 in the third exemplary embodiment is described below using flow charts in FIG. 14A and FIG. 14B. For clarity, the command reception process in the third exemplary embodiment is broken into two parts: the first part is illustrated by FIG. 14A and the second part is illustrated by FIG. 14B. In other words, FIG. 14A and FIG. 14B represent a single process. The connectors Z and W in FIG. 14A and FIG. 14B are flowchart symbols to indicate continuity of the process from one figure to the next. The command reception process in the third exemplary embodiment may be realized by the CPU 205 executing the computer programs or instructions stored in the ROM 206. The command reception process illustrated in FIG. 14A and FIG. 14B is performed if the power receiving apparatus 200 is within a range in which the power receiving apparatus 200 may receive power supplied from the power supply apparatus 100. If the command reception process is performed by the CPU 205, the switch 601 of the matching circuit 202 is connected to one of the resistor 604*a* and the resistor 604*b* and the switch 602 is connected to one of the coil 605*a* and the coil 605*b*. Furthermore, if the command reception process is performed by the CPU 205, the switch 603 of the matching circuit 202 is connected to one of the capacitor 606*a* and the capacitor 606*b*.

Figure 8:
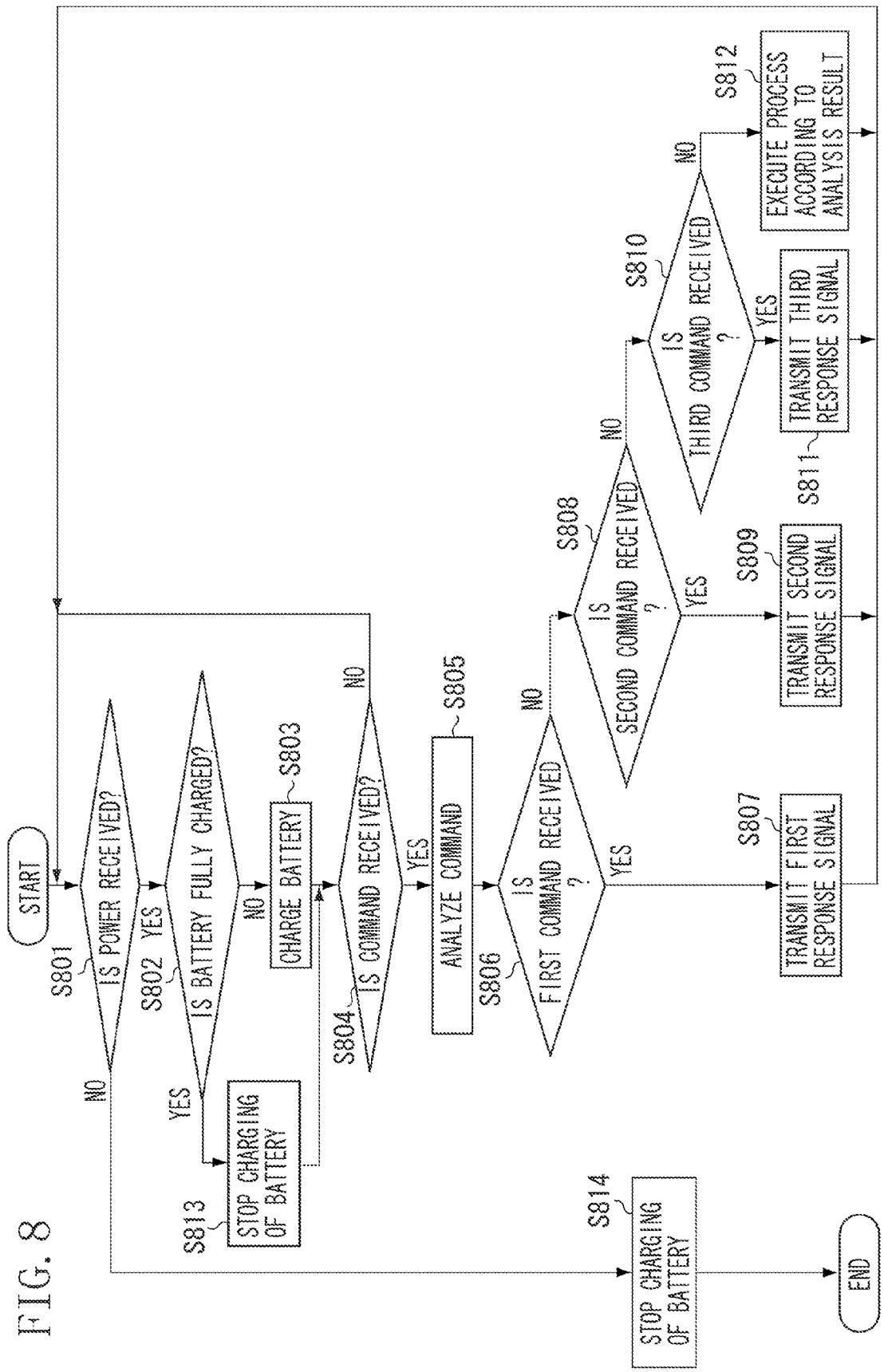
FIG. 8 is a flow chart illustrating an example of command transmission process performed by a power receiving apparatus in the first and second exemplary embodiments.

The command reception process in steps S1401 to S1411 illustrated in FIG. 14A and FIG. 14B is similar to that in steps S801 to S811 illustrated in FIG. 8, so that the description thereof is omitted herein. Furthermore, the command reception process in steps S1415 to S1417 illustrated in FIG. 14A and FIG. 14B is similar to that in steps S812 to S814 illustrated in FIG. 8, so that the description thereof is omitted herein. The command received by the modulation and demodulation circuit 204 is analyzed (in step S1405), the process proceeds from step S1405 to step S1406 shown in FIG. 14B via the connector Z.

If the CPU 205 determines that the command received by the modulation and demodulation circuit 204 is not the third command (NO in step S1410), the process proceeds from operation S1410 to operation S1412.

In operation S1412, the CPU 205 determines whether the command received by the modulation and demodulation circuit 204 is the fourth command based on the analysis results supplied from the modulation and demodulation circuit 204. If the CPU 205 determines that the command received by the modulation and demodulation circuit 204 is not the fourth command (NO in step S1412), the process proceeds from step S1412 to step S1415. If the CPU 205 determines that the command received by the modulation and demodulation circuit 204 is the fourth command (YES in step S1412), the process proceeds from step S1412 to step S1413.

In step S1413, the CPU 205 controls the modulation and demodulation circuit 204 to transmit the fourth response signal to the power supply apparatus 100. The CPU 205 controls the modulation and demodulation circuit 204 to perform the load modulation for transmitting information indicating affirmation for the operation designated by the fourth command to the power supply apparatus 100 as the fourth response signal. If the fourth response signal is transmitted to the power supply apparatus 100, the process proceeds from step S1413 to step S1414.

In step S1414, the CPU 205 performs a power receiving control process described below using information included in the fourth command acquired from the analysis results supplied from the modulation and demodulation circuit 204 in step S1405. If the power receiving control process is performed by the CPU 205, the process returns from step S1414 to step S1401.

Figure 15:
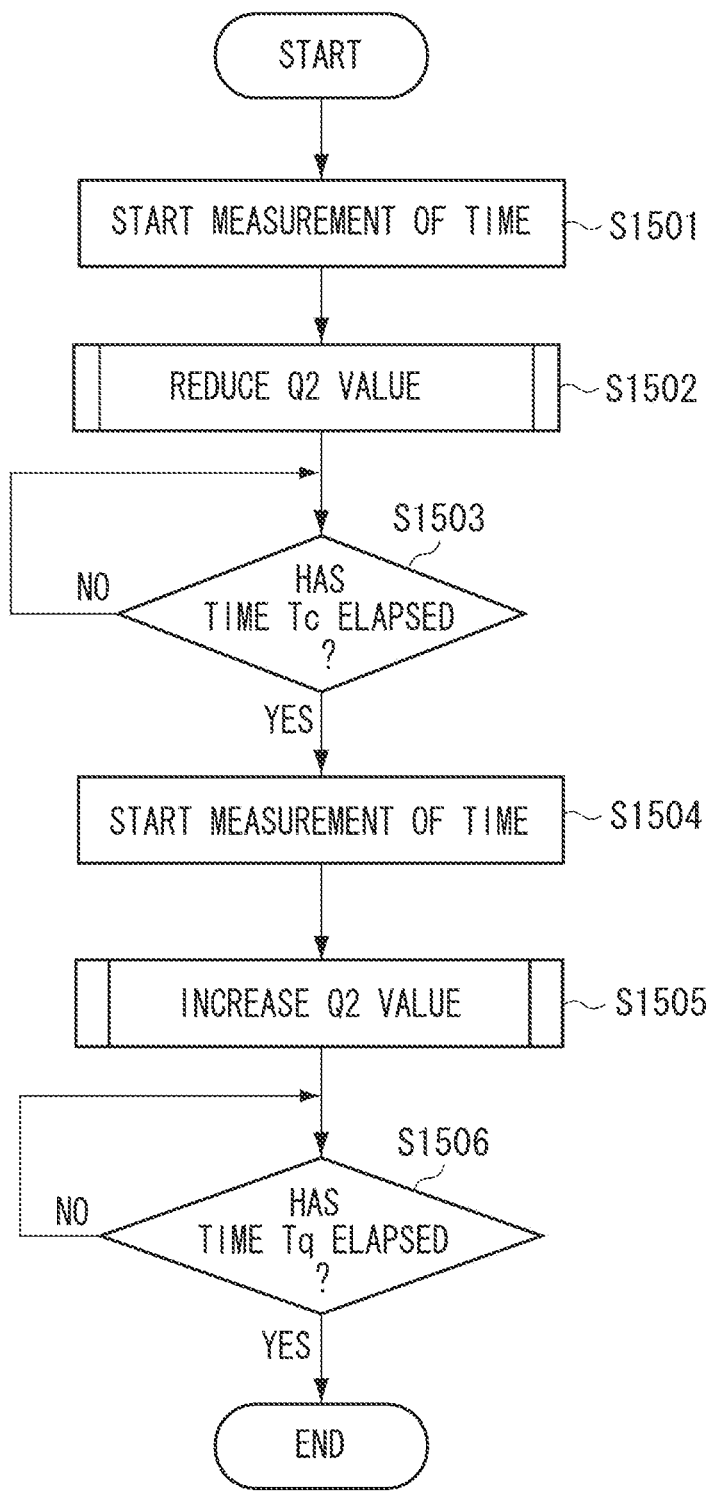
FIG. 15 is a flow chart illustrating an example of power receiving control process performed by the power receiving apparatus in the third exemplary embodiment.

The power receiving control process performed by the power receiving apparatus 200 in the third exemplary embodiment is described below using a flow chart in FIG. 15. The power receiving control process in the third exemplary embodiment may be realized by the CPU 205 executing the computer programs or instructions stored in the ROM 206. If the power receiving control process is performed by the CPU 205, the switch 601 of the matching circuit 202 is connected to one of the resistor 604*a* and the resistor 604*b* and the switch 602 is connected to one of the coil 605*a* and the coil 605*b*. Furthermore, if the power receiving control process is performed by the CPU 205, the switch 603 of the matching circuit 202 is connected to one of the capacitor 606*a* and the capacitor 606*b*.

In step S1501, the CPU 205 controls the timer 211 to measure the time r elapsed after the fourth response signal is received. If the timer 211 is controlled to measure the time, the time measured and stored in the RAM 107 is reset and the process in step S1501 is performed.

The time r measured by the timer 211 is stored in the RAM 207. Next, the process proceeds from step S1501 to step S1502.

In step S1502, the CPU 205 performs the process for reducing or decreasing the Q2 value. The process for decreasing the Q2 value performed in step S1502 may be similar to that performed by the power supply apparatus 100 in the first and second exemplary embodiments. For example, if the switch 601 of the matching circuit 202 is connected to the resistor 604*b*, the CPU 205 controls the switch 601 so that the switch 601 is connected from the resistor 604*b* to the resistor 604*a*. This increases the impedance R2 of resistor of the matching circuit 202 and the CPU 205 may decrease the Q2 value.

On the other hand, for example, if the switch 602 of the matching circuit 202 is connected to the coil 605*a*, the CPU 205 controls the switch 602 so that the switch 602 is connected from the coil 605*a* to the coil 605*b*. This decreases the inductance L2 of the matching circuit 202 and the CPU 205 may decrease the Q2 value. If the value of inductance L2 of the matching circuit 202 is changed, the CPU 205 adjusts also the value of the capacitance C2 to keep the resonance frequency f constant.

If the switch 603 of the matching circuit 202 is connected to the capacitor 606*b*, the CPU 205 controls the switch 603 so that the switch 603 is connected from the capacitor 606*b* to the capacitor 606*a*. This increases the capacitance C2 of the matching circuit 202 and the CPU 205 may decrease the Q2 value. If the value of capacitance C2 of the matching circuit 202 is changed, the CPU 205 adjusts also the value of the inductance L2 to keep the resonance frequency f constant.

In step S1502, the CPU 205 controls the matching circuit 202 so that the Q2 value becomes the value at which the power receiving apparatus 200 may receive the command from the power supply apparatus 100 and transmit the response signal in response to the received command to the power supply apparatus 100.

In this case, the Q2 value may be different from the Q1 value or equal thereto. If the process for decreasing the Q2 value is performed in step S1502, the process proceeds from step S1502 to step S1503.

In step S1503, the CPU 205 determines whether the time r measured by the timer 211 in step S1501 reaches the predetermined time Tc. The predetermined time Tc is information which the power receiving apparatus 200 acquires from the information included in the fourth command analyzed by the modulation and demodulation circuit 204 and is stored in the RAM 207 after the fourth command is analyzed by the modulation and demodulation circuit 204.

If the CPU 205 determines that the time r measured by the timer 211 reaches the predetermined time Tc (YES in step S1503), the process proceeds from step S1503 to step S1504. If the CPU 205 determines that the time r measured by the timer 211 does not reach the predetermined time Tc (NO in step S1503), the process returns from step S1503 to step S1503. In this case, the CPU 205 decrease the Q2 value so that the power receiving apparatus 200 may communicate with the power supply apparatus 100 until the predetermined time Tc elapses.

In this case, the CPU 105 causes the power receiving apparatus 200 to receive the command transmitted from the power supply apparatus 100 until the predetermined time Tc has elapsed after the fourth response signal is transmitted, allowing the power receiving apparatus 200 to communicate with the power supply apparatus 100. Therefore, although the efficiency of reception of the power supplied from the power supply apparatus 100 is reduced until the predetermined time Tc has elapsed after the fourth response signal is transmitted, the CPU 105 allows the power receiving apparatus 200 to communicate with the power supply apparatus 100 using the command.

In step S1504, the CPU 205 controls the timer 211 to measure the time q elapsed after it is determined that the time r measured by the timer 211 reaches the predetermined time Tc. If the timer is already controlled to measure the time, the time measured and stored in the RAM 207 is reset and the process in step S1504 is performed. The time q measured by the timer 211 is stored in the RAM 207. In this case, the process proceeds from step S1504 to step S1505.

In step S1505, the CPU 205 performs the process for increasing the Q2 value. The process for increasing the Q2 value performed in step S1505 may be similar to that performed by the power supply apparatus 100 in the first and second exemplary embodiments. For example, if the switch 601 of the matching circuit 202 is connected to the resistor 604a, the CPU 205 controls the switch 601 so that the switch 601 is connected from the resistor 604a to the resistor 604b to reduce the impedance R2 of resistor of the matching circuit 202. Thereby, the CPU 205 may increase the Q2 value.

On the other hand, if the switch 602 of the matching circuit 202 is connected to the coil 605b, the CPU 205 controls the switch 602 so that the switch 602 is connected from the coil 605b to the coil 605a to increase the inductance L2 of the matching circuit 202. Thereby, the CPU 205 may increase the Q2 value. If the value of inductance L2 of the matching circuit 202 is changed, the CPU 205 adjusts also the value of the capacitance C2 to keep the resonance frequency f constant.

If the switch 603 of the matching circuit 202 is connected to the capacitor 606a, the CPU 205 controls the switch 603 so that the switch 603 is connected from the capacitor 606a to the capacitor 606b. This decreases the capacitance C2 of the matching circuit 202 and the CPU 205 may increase the Q2 value. If the value of capacitance C2 of the matching circuit 202 is changed, the CPU 205 adjusts also the value of the inductance L2 to keep the resonance frequency f constant.

In this case, the Q2 value may be different from the Q1 value or equal thereto. If the process for increasing the Q2 value is performed in step S1505, the process proceeds from step S1505 to step S1506.

In step S1506, the CPU 205 determines whether the time q measured by the timer 211 in step S1504 reaches the predetermined time Tq. If the CPU 205 determines that the time q measured by the timer 211 reaches the predetermined time Tq (YES in operation S1506), the process is ended. If the CPU 205 determines that the time q measured by the timer 211 does not reach the predetermined time Tq (NO in step S1506), the process returns from step S1506 to step S1506. The predetermined time Tq is information which the power receiving apparatus 200 acquires from the information included in the fourth command analyzed by the modulation and demodulation circuit 204 and is stored in the RAM 207 after the fourth command is analyzed by the modulation and demodulation circuit 204.

In this case, although the power receiving apparatus 200 may not communicate with the power supply apparatus 100 using the command until the predetermined time Tq elapses, the CPU 205 controls the matching circuit 202 so that the Q2 value becomes such a value as to increase the efficiency of charging the power supplied from the power supply apparatus 100. Thereby, the CPU 205 allows efficiently charging the battery 210.

Thus, in the third exemplary embodiment, the power supply apparatus 100 performs control such that the Q1 value of the power supply apparatus 100 and the Q2 value of the power receiving apparatus 200 become the value at which the power supply apparatus 100 may communicate with the power receiving apparatus 200 using the command until the predetermined time Tc elapses. Thereby, the power supply apparatus 100 controls not only the Q1 value of the power supply apparatus 100 but also the Q2 value of the power receiving apparatus 200 synchronously therewith, so that the power supply apparatus 100 may communicate with the power receiving apparatus 200 until the predetermined time Tc elapses.

The power supply apparatus 100 controls the Q1 value to increase the efficiency of power supplied to the power receiving apparatus 200 and the power receiving apparatus 200 controls the Q2 value to increase the efficiency of power received from the power supply apparatus 100 until the predetermined time Tq elapses. Thereby, the power supply apparatus 100 controls not only the Q1 value of the power supply apparatus 100 but also the Q2 value of the power receiving apparatus 200 synchronously therewith, so that the efficiency of charge of the battery 210 performed by the power receiving apparatus 200 may be increased until the predetermined time Tc elapses.

Since the power supply apparatus 100 may control the Q1 value and the Q2 value by time division, the power supply apparatus 100 and the power receiving apparatus 200 may be controlled to prioritize communication using the command at a specific timing. The power supply apparatus 100 may perform control to increase the efficiency of power supplied by the power supply apparatus 100 and the efficiency of power received by the power receiving apparatus 200 to prioritize the charge of the battery 210 at another timing.

The matching circuit 202 of the power receiving apparatus 200 uses the circuit illustrated in FIG. 12, but is not limited to this. The matching circuit 202 of the power receiving apparatus 200 may use the circuit illustrated in FIG. 16, for example.

Figure 16:
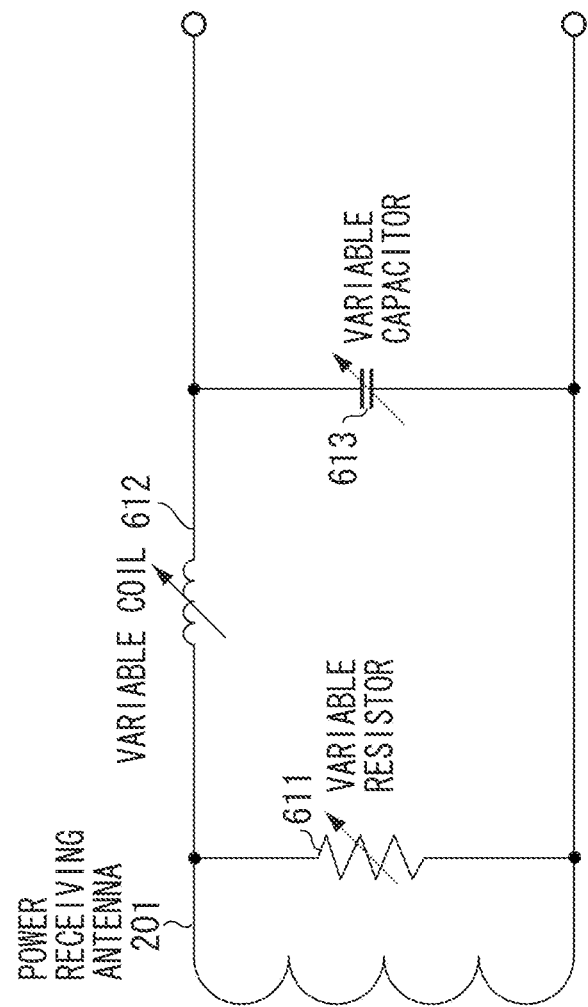
FIG. 16 illustrates an example of a matching circuit of the power receiving apparatus in the third exemplary embodiment.

The matching circuit 202 illustrated in FIG. 16 includes a variable resistor 611 instead of the switch 601 and the resistors 604a and 604b and a variable coil 612 instead of the switch 602 and the coils 605a and 605b. The matching circuit 202 illustrated in FIG. 16 further includes a variable capacitor 603 instead of the switch 603 and the capacitors 606a and 606b.

The variable capacitor 613 is the one which matches impedance and adjusts the resonance frequency f determined by equation (3). The CPU 205 controls the variable capacitor 613 by a motor or a variable capacitance diode to change the capacitance C2 of the matching circuit 202. The variable coil 612 is the one which adjusts the resonance frequency f determined by equation (3). The CPU 205 controls the variable coil 612 by a motor to change the inductance L2 of the matching circuit 202. The variable resistor 611 is a damping resistor. The CPU 205 controls the variable resistor 611 by a digital potentiometer to change the impedance R2 of resistor of the matching circuit 202. Although the variable resistor 611 is connected in parallel to the power receiving antenna 201, the variable resistor 611 may be connected in series thereto. The variable resistor 611, the variable coil 612 and the variable capacitor 613 are used for change the Q2 value.

If the matching circuit 202 of the power receiving apparatus 200 is a circuit as illustrated in FIG. 16, the process for reducing the Q2 value performed in step S1502 may be similar to that performed by the power supply apparatus 100 in the first and second exemplary embodiments. In this case, for example, the CPU 205 performs control to increase the value of impedance of resistor of the variable resistor 611, increasing the value of the impedance R2 of resistor of the matching circuit 202. Thereby, the CPU 205 may reduce the Q2 value. For example, the CPU 205 performs control to decrease the value of inductance of the variable coil 612, decreasing the value of the inductance L2 of the matching circuit 202. Thereby, the CPU 205 may reduce the Q2 value. If the value of the inductance L2 of the matching circuit 202 is changed, the CPU 205 performs the process for adjusting also the capacitance C2 of the matching circuit 202 to keep the resonance frequency f determined by equation (3) constant.

For example, the CPU 205 performs control to increase the value of capacitance of the variable capacitor 613, increasing the value of the capacitance C2 of the matching circuit 202. Thereby, the CPU 205 may reduce the Q2 value. If the value of the capacitance C2 of the matching circuit 202 is changed, the CPU 205 performs the process for adjusting the inductance L2 to keep the resonance frequency f determined by equation (3) constant.

If the matching circuit 202 of the power receiving apparatus 200 is a circuit as illustrated in FIG. 16, the process for increasing the Q2 value performed in step S1505 may be similar to that performed by the power supply apparatus 100 in the first and second exemplary embodiments. In this case, for example, the CPU 205 performs control to decrease the value of impedance of resistor of the variable resistor 611, increasing the value of the impedance R2 of resistor of the matching circuit 202. Thereby, the CPU 205 may increase the Q2 value. For example, the CPU 205 performs control to increase the value of inductance of the variable coil 612, increasing the value of the inductance L2 of the matching circuit 202. Thereby, the CPU 205 may increase the Q2 value. If the value of the inductance L2 of the matching circuit 202 is changed, the CPU 205 performs the process for adjusting the capacitance C2 to keep the resonance frequency f determined by equation (3) constant.

For example, the CPU 205 performs control to decrease the value of capacitance of the variable capacitor 613, decreasing the value of the capacitance C2 of the matching circuit 202. Thereby, the CPU 205 may increase the Q2 value. If the value of the capacitance C2 of the matching circuit 202 is changed, the CPU 205 performs the process for adjusting the inductance L2 to keep the resonance frequency f determined by equation (3) constant.

Also in the first and second exemplary embodiments, the power receiving apparatus 200 may include the matching circuit 202 described in the third exemplary embodiment.

The power supply apparatus 100 according to the exemplary embodiment of the present invention is not limited to the power supply apparatus 100 described in the first to third exemplary embodiments. The power receiving apparatus 200 according to the exemplary embodiment of the present invention is not limited to the power receiving apparatus 200 described in the first to third exemplary embodiments either. The power supply apparatus 100 and the power receiving apparatus 200 according to the exemplary embodiment of the present invention may be realized by a system comprised of a plurality of devices.

The various process and functions described in the first to third exemplary embodiments may be realized by a computer or processor executing computer programs or instructions stored in a memory device. In this case, the computer programs according to the exemplary embodiments of the present invention may be executed by a computer, machine, processor or a programmable device and realize various functions described in the first exemplary embodiment.

The computer program or instructions according to the exemplary embodiments of the present invention may realize various processing and functions described in the first exemplary embodiment using an operating system (OS) operating on a computer.

The computer program according to the exemplary embodiments of the present invention may be read from a computer-readable non-transitory storage medium and executed by a computer, a machine, a processor, or a programmable device. A hard disk device, an optical disk, a CD-ROM, a CD-R, a memory card, and a ROM may be used as the computer-readable storage medium. The computer program according to the present invention may be provided for a computer from an external apparatus via a communication interface and executed by the computer Disclosed aspects of the embodiments may be realized by an apparatus, a machine, a method, a process, or an article of manufacture that includes a non-transitory storage medium having a program or instructions that, when executed by a machine or a processor, cause the machine or processor to perform operations as described above. The method may be a computerized method to perform the operations with the use of a computer, a machine, a processor, or a programmable device. The operations in the method involve physical objects or entities representing a machine or a particular apparatus (e.g., power supply apparatus, external apparatus). In addition, the operations in the method transform the elements or parts from one state to another state. The transformation is particularized and focused on controlling a power supply apparatus. The transformation provides a different function or use such as controlling or modifying a quality factor of the power supply apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-194048 filed Aug. 31, 2010, which is hereby incorporated by reference herein in its entirety.

What is claimed is:

1. A power supply apparatus comprising:
   an antenna unit that is used to wirelessly supply power to a power receiving apparatus;
   a matching unit coupled to the antenna unit; and
   a control unit that (a) determines whether a value of quality factor is larger than a predetermined value or not before a process of transmitting a predetermined command to the power receiving apparatus via the antenna unit is performed and after the antenna unit wirelessly supplies the power to the power receiving apparatus, (b) changes the value of quality factor to be less than the predetermined value by controlling the matching unit before the process of transmitting the predetermined command to the power receiving apparatus via the antenna unit is performed and after the antenna unit wirelessly supplies the power to the power receiving apparatus, when the value of quality factor is larger than the predetermined value, (c) performs the process of transmitting the predetermined command to the power receiving apparatus via the antenna unit without changing the value of quality factor to be less than the predetermined value by controlling the matching unit, when the value of quality factor is not larger than the predetermined value, and (d) after receiving a response from the power receiving apparatus, increases the quality factor to a value larger than the predetermined value wherein the quality factor is increased regardless of whether a response is received once a predetermined time period has elapsed.

2. The power supply apparatus according to claim 1, wherein the control unit decreases the value of quality factor by controlling the matching unit when a condition for decreasing power to be supplied to the power receiving apparatus is satisfied, and wherein the control unit increases the value of quality factor by controlling the matching unit when a condition for increasing power to be supplied to the power receiving apparatus is satisfied.

3. A method comprising:

determining whether a value of quality factor is larger than a predetermined value or not before a process of transmitting a predetermined command to a power receiving apparatus via an antenna unit is performed and after wirelessly supplying power to the power receiving apparatus, wherein the antenna unit is used to wirelessly supply power to the power receiving apparatus;

changing the value of quality factor to be less than the predetermined value by controlling a matching unit coupled to the antenna unit before the process of transmitting the predetermined command to the power receiving apparatus via the antenna unit is performed and after wirelessly supplying the power to the power receiving apparatus, when the value of quality factor is larger than the predetermined value;

performing the process of transmitting the predetermined command to the power receiving apparatus via the antenna unit without changing the value of quality factor to be less than the predetermined value by controlling the matching unit, when the value of quality factor is not larger than the predetermined value, and after receiving a response from the power receiving apparatus, increases the quality factor to a value larger than the predetermined value wherein the quality factor is increased regardless of whether a response is received once a predetermined time period has elapsed.

4. A non-transitory storage medium that stores a program for causing a computer to perform a method, the method comprising:

determining whether a value of quality factor is larger than a predetermined value or not before a process of transmitting a predetermined command to a power receiving apparatus via an antenna unit is performed and after wirelessly supplying power to the power receiving apparatus, wherein the antenna unit is used to wirelessly supply power to the power receiving apparatus;

changing the value of quality factor to be less than the predetermined value by controlling a matching unit coupled to the antenna unit before the process of transmitting the predetermined command to the power receiving apparatus via the antenna unit is performed and after wirelessly supplying the power to the power receiving apparatus, when the value of quality factor is larger than the predetermined value; and performing the process of transmitting the predetermined command to the power receiving apparatus via the antenna unit without changing the value of quality factor to be less than the predetermined value by controlling the matching unit, when the value of quality factor is not larger than the predetermined value, after receiving a response from the power receiving apparatus, increases the quality factor to a value larger than the predetermined value wherein the quality factor is increased regardless of whether a response is received once a predetermined time period has elapsed.

5. The method according to claim 3, further comprising:

decreasing the value of quality factor by controlling the matching unit when a condition for decreasing power to be supplied to the power receiving apparatus is satisfied; and increasing the value of quality factor by controlling the matching unit when a condition for increasing power to be supplied to the power receiving apparatus is satisfied.

6. The power supply apparatus according to claim 1, wherein the control unit adjusts a resonance frequency of the power supply apparatus to be a predetermined frequency by controlling the matching unit, when the value of quality factor is changed to be less than the predetermined value.

7. The power supply apparatus according to claim 1, wherein the control unit adjusts a resonance frequency of the power supply apparatus to be a predetermined frequency by controlling the matching unit, when the value of quality factor is changed to be larger than the predetermined value.

8. The power supply apparatus according to claim 1, wherein the matching unit includes:

a coil that is connected to the antenna unit in series;
a first capacitor that is connected to the antenna unit in parallel; and
a second capacitor that is connected to the coil in series.

9. The power supply apparatus according to claim 1, wherein the predetermined command is used to obtain identification information of the power receiving apparatus.

10. The power supply apparatus according to claim 1, wherein the predetermined command is used to obtain capability information of the power receiving apparatus.

11. The power supply apparatus according to claim 1, wherein the antenna unit is used to wirelessly supply power to the power receiving apparatus by electromagnetic induction or magnetic field resonance.

12. The power supply apparatus according to claim 1, wherein the power receiving apparatus includes a camera, a phone, or an audio player.

13. The method according to claim 3, further comprising adjusting a resonance frequency of a power supply apparatus to be a predetermined frequency by controlling the matching unit, when the value of quality factor is changed to be less than the predetermined value.

14. The method according to claim 3, further comprising adjusting a resonance frequency of a power supply apparatus to be a predetermined frequency by controlling the matching unit, when the value of quality factor is changed to be larger than the predetermined value.

15. The method according to claim 3, wherein the matching unit includes:
   a coil that is connected to the antenna unit in series;
   a first capacitor that is connected to the antenna unit in parallel; and
   a second capacitor that is connected to the coil in series.

16. The method according to claim 3, wherein the predetermined command is used to obtain identification information of the power receiving apparatus.

17. The method according to claim 3, wherein the predetermined command is used to obtain capability information of the power receiving apparatus.

18. The method according to claim 3, wherein the antenna unit is used to wirelessly supply power to the power receiving apparatus by electromagnetic induction or magnetic field resonance.

19. The method according to claim 3, wherein the power receiving apparatus includes a camera, a phone, or an audio player.

\* \* \* \* \*